US005534690A

United States Patent [19]

Goldenberg et al.

[11] Patent Number: 5,534,690

[45] Date of Patent: Jul. 9, 1996

[54] METHODS AND APPARATUS FOR COUNTING THIN STACKED OBJECTS

[76] Inventors: Lior Goldenberg, 4 Helez Street, Holon 58421; Charlie S. Antebi, 17 Harel Street, Holon 58231; Oded R. Hecht, 55 Reading Street, Tel Aviv 69460, all of Israel

[21] Appl. No.: 374,806

[22] Filed: Jan. 19, 1995

[51] Int. Cl.$^6$ ..................... G01V 9/04

[52] U.S. Cl. ..................... 250/222.1; 414/901; 377/8

[58] Field of Search ..................... 250/222.1, 223 R, 250/223 B, 224, 222.2, 559.4, 559.47, 559.49, 556; 271/110, 213, 111, 117, 120; 414/901, 788.4, 789.5, 790; 356/71; 377/8, 53, 6, 18; 382/135, 137, 318, 321

[56] References Cited

U.S. PATENT DOCUMENTS

| | | | |
|---|---|---|---|
| Re. 27,869 | 1/1974 | Willits et al. | 235/92 |
| 3,916,194 | 10/1975 | Novak et al. | 250/556 |
| 3,971,918 | 7/1976 | Saito | 235/92 |
| 4,227,071 | 10/1980 | Tomyn | 250/559.27 |
| 4,500,002 | 2/1985 | Koshio et al. | 271/186 |
| 4,694,474 | 9/1987 | Dorman et al. | 377/6 |
| 4,912,317 | 3/1990 | Mohan et al. | 250/222.2 |
| 5,005,192 | 4/1991 | Duss | 377/8 |
| 5,017,773 | 5/1991 | Sato | 250/223 R |
| 5,040,196 | 8/1991 | Woodward | 377/8 |
| 5,202,554 | 4/1993 | Wilton et al. | 250/222.2 |
| 5,324,921 | 6/1994 | Takarada et al. | 235/98 R |
| 5,426,708 | 6/1995 | Hamada et al. | 382/125 |

FOREIGN PATENT DOCUMENTS

| | | | |
|---|---|---|---|
| 0321593 | 12/1989 | Japan | 377/8 |
| 130596 | 5/1992 | Japan | 377/8 |

*Primary Examiner*—Edward P. Westin
*Assistant Examiner*—Que T. Le
*Attorney, Agent, or Firm*—Limbach & Limbach; W. Patrick Bengtsson; Patricia Coleman James

[57] ABSTRACT

An improved method and apparatus for rapidly, accurately and inexpensively counting stacked objects, preferably by imaging, from below, a stack of flat objects which is standing on its side, preferably on its long side. The objects need not be identical in surface appearance or in configuration. The objects preferably may be of substantially any size or thickness and need not be less than some maximum size or within some narrow range of thicknesses.

17 Claims, 6 Drawing Sheets

METHODS AND APPARATUS FOR COUNTING THIN STACKED OBJECTS

FIELD OF THE INVENTION

The present invention relates generally to methods and apparatus for counting objects and more particularly to methods and apparatus for counting stacked flat objects.

BACKGROUND OF THE INVENTION

U.S. Pat. Re. No. 27,869 to Willits et al describes apparatus for counting stacked sheets having no sheet separation requirements. The active area of a sensor array is matched to the width of a sheet and the sensor array traverses the stack. The signal output of the sensor array is stripped of unwanted components in a high gain, diode clamped capacitive input operation amplifier whose square wave output is processed and counted by a counting circuit.

U.S. Pat. No. 5,005,192 to Duss describes a system for counting flat objects in a stream of partially overlapping objects which are conveyed past a locus of impingement of ultrasonic waves.

U.S. Pat. No. 4,694,474 to Dorman et al describes a device for counting a stack of thin objects in which light is directed at the stack and a light sensor generates a signal proportional to the light reflected by the stack.

U.S. Pat. No. 5,040,196 to Woodward describes an instrument for counting stacked elements which images a portion of the side of the stack and then autocorrelates the image, while the instrument is stationary, and then cross-correlates the image as the instrument is moved. The result is a time varying signal whose repeating cycles, when counted, indicate the number of elements in the stack.

U.S. Pat. No. 3,971,918 to Saito counts stacked corrugated cardboards by scanning an end of the stack horizontally and vertically, using an array of photodiodes switched in turn by electric pulses. The outputs of the photodiodes are counted and compared to successively detect flat and corrugated sheets.

U.S. Pat. No. 4,912,317 to Mohan et al describes apparatus for counting stacked sheets whose apparent brightness is not uniform. The Mohan et al system normalizes the phase polarity of the sensor signal differential output, thereby avoiding the effects of brightness polarity reversals in the sensor output data. Mohan et al employs sensors whose effective imaged width on the stacked objects is very narrow relative to the individual objects. The data is differentially summed, then rectified to normalize phase polarity.

None of the above U.S. Patents teaches that the devices described therein are suitable for counting banknotes.

U.S. Pat. No. 5,324,921 describes a conventional sheet counting machine in which a photosensor is disposed across a bill passage downstream of a pulley. Emitted light is interrupted by each bill passing throught the light path and therefore the number of bills can be counted by counting the number of intervals during which light is not received by the light receiver.

A general text on image processing is Pratt, W. K, *Digital image processing*, Second Ed., Wiley 1991, New York.

The disclosures of all of the above publications and of the references cited therein are hereby incorporated by reference.

Brandt, Inc. of Bensalem, Pa. 19020, USA, markets a Model 8640D Note Counter accomodating notes of at least a minimum note size and thickness and no more than a maximum note size and thickness. The 8640D leafs through the banknotes in order to determine the number of banknotes.

SUMMARY OF THE INVENTION

The present invention seeks to provide an improved method and apparatus for rapidly, accurately and inexpensively counting stacked objects, preferably by imaging, from below, a stack of flat objects which is standing on its side, preferably on its long side. The objects need not be identical in surface appearance or in configuration. The objects preferably may be of substantially any size or thickness and need not be less than some maximum size or within some narrow range of thicknesses.

Preferably, the objects are not leafed through or otherwise moved while being imaged, in contrast to conventional devices for counting banknotes and documents such as the counting device described in U.S. Pat. No. 5,324,921 or the Brandt Note Counter.

This feature allows a loose or fastened together stack of objects, such as a stapled-together stack of papers, a rubber-banded stack of bills, or the pages of a bound volume, to be counted without being dismantled.

A stack preferably includes a plurality of objects which are generally pairwise adjacent, although not necessarily touching, wherein the edges of pairwise adjacent objects in the stack are at least roughly aligned. One example of a stack is a vertical stack which preferably includes a plurality of objects which are stacked one on top of another. Another example of a stack is a horizontal stack which preferably includes a plurality of objects standing one next to the other. Stacked flat objects may be disposed perpendicular to the ground or at any other orientation relative to the ground and may or may not be parallel to one another.

Preferably, the stacked objects are imaged by a matrix-CCD, and neither the CCD nor the stack of objects is moved during imaging. An advantage of this embodiment is that the counting apparatus may have no moving parts and therefore may be simple to manufacture, operate and maintain.

Alternatively, the stack may be manually or automatically caused to slide over the field of view of the optical sensor which images the stack or a moving line-CCD may replace the matrix-CCD. The motion may be provided specifically to facilitate counting or alternatively, objects in motion may be counted, utilizing the existing path of motion of the objects.

Optionally, a laser emitting device such as a laser diode or a He-Ne laser may provide light and an optical sensor suitable for sensing laser rays may be employed. The laser beam may travel along the side of the stack or alternatively, the stack may be slid manually or automatically relative to the stationary laser beam so as to enable the laser beam to scan a portion of each edge of each object and/or of each gap between each two adjacent objects. The reflected or transmitted beam is then processed in order to discern the number of objects in the stack.

In the present specification and claims, the surface area of a flat object is regarded as including two "surfaces" and at least one "edge", where each edge is a nearly one-dimensional face of the object. If the object is rectangular, it has two surfaces and four edges. For example, a piece of paper has front and back surfaces and four edges.

The "edge" of an object within a stack is used herein to refer to a face of the stacked object which is parallel to the axis of the stack.

More generally, the term "edge" is employed herein to refer to a portion of an object which is imaged in order to count the number of objects.

The term "side of a stack" pertaining to a stack of flat objects, refers to one of the four faces of the stack which are formed of the edges of the stacked objects and not to the remaining two faces of the stack which are formed of a surface of the first object in the stack and a surface of the last object in the stack, respectively.

It is believed that the present invention is applicable to counting of flat round or curved objects. In this case, the "side of the stack" refers to a face of the stack which is formed of the edges of the stacked round objects.

According to a preferred embodiment of the present invention, counting is effected by imaging a side of the stack. In the resulting images, particularly if the objects are sheets of paper, the sheet edges are seen to be non-uniform, due to material wear, bent sheets, torn sheets, folded sheets and the tendency of paper to adopt a wave-like configuration.

There is thus provided in accordance with a preferred embodiment of the present invention a method for counting banknotes including providing a stack of banknotes and estimating the number of banknotes in the stack wherein the estimation process is characterized in that the mutual orientation of the banknotes is substantially maintained.

Also provided is apparatus for counting stacked objects including at least one optical sensor for simultaneously viewing a plurality of locations along a side of a stack of objects, the locations being arranged along the edges of the objects which form the side of the stack and image processing apparatus receiving an output from the optical sensor and providing an output indication of a number of objects in the stack.

Further in accordance with a preferred embodiment of the present invention, the optical sensor includes a plurality of sensing elements respectively viewing the plurality of locations along the side of the stack.

Still further in accordance with a preferred embodiment of the present invention, the optical sensor has a two-dimensional field of view.

Further in accordance with one preferred embodiment of the present invention, apparatus is provided for varying the position of the stack relative to the optical sensor.

Still further in accordance with one preferred embodiment of the present invention, the apparatus for varying includes apparatus for moving the stack.

Additionally in accordance with one preferred embodiment of the present invention, the apparatus for varying includes apparatus for moving the optical sensor relative to the stack.

Further in accordance with one preferred embodiment of the present invention, the optical sensor is operative to repeatedly view at least one location along the stack of objects.

Also provided, in accordance with one preferred embodiment of the present invention, is a method for counting stacked objects including viewing at least a portion of a side of a stack of objects at least under first illumination conditions and under second illumination conditions, and image processing apparatus receiving an output from the optical sensor including a first image of at least a portion of the stack under the first illumination conditions and a second image of at least a portion of the stack under the second illumination conditions, and operative to compare the two images and to provide an output indication of a number of objects in the stack.

Additionally provided, in accordance with a preferred embodiment of the present invention, is apparatus for counting stacked objects including at least one support for at least one stack of objects, at least one optical sensor disposed behind the at least one support for viewing at least a portion of a side of a stack of objects through the support, and image processing apparatus receiving an output from the optical sensor and providing an output indication of a number of objects in the stack.

Further in accordance with a preferred embodiment of the present invention, the support is transparent.

Still further in accordance with a preferred embodiment of the present invention, the support has at least one window formed therein.

Additionally in accordance with a preferred embodiment of the present invention, there is provided a method for counting banknotes including imaging a stack of banknotes from the side, and image-processing the resulting image in order to compute the number of banknotes in the stack.

Further in accordance with a preferred embodiment of the present invention, the apparatus also includes an object separator operative to separate objects in the stack from one another to facilitate counting thereof.

Further in accordance with a preferred embodiment of the present invention, the method also includes separating the banknotes in the stack from one another to facilitate counting thereof.

Additionally in accordance with a preferred embodiment of the present invention, the at least one optical sensor includes a plurality of optical sensors each of which is operative to view a plurality of locations along a side of a different stack.

Further in accordance with a preferred embodiment of the present invention, the at least one optical sensor includes a plurality of optical sensors each of which is operative to view at least a portion of a side of a different stack of objects.

Still further in accordance with a preferred embodiment of the present invention, a plurality of light sources illuminates the stacked objects.

Further in accordance with a preferred embodiment of the present invention, the first illumination conditions include ambient illumination.

BRIEF DESCRIPTION OF THE DRAWINGS AND APPENDICES

The present invention will be understood and appreciated from the following detailed description, taken in conjunction with the drawings in which.

Attached herewith are the following appendices which aid in the understanding and appreciation of one preferred embodiment of the invention shown and described herein:

Appendix A is a computer listing of a program entitled EZ_MONEY.PAS, a program which implements a banknote counting method operative in accordance with a preferred embodiment of the present invention; and Appendix B is a computer listing of MODEX.ASM, a public domain software package.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
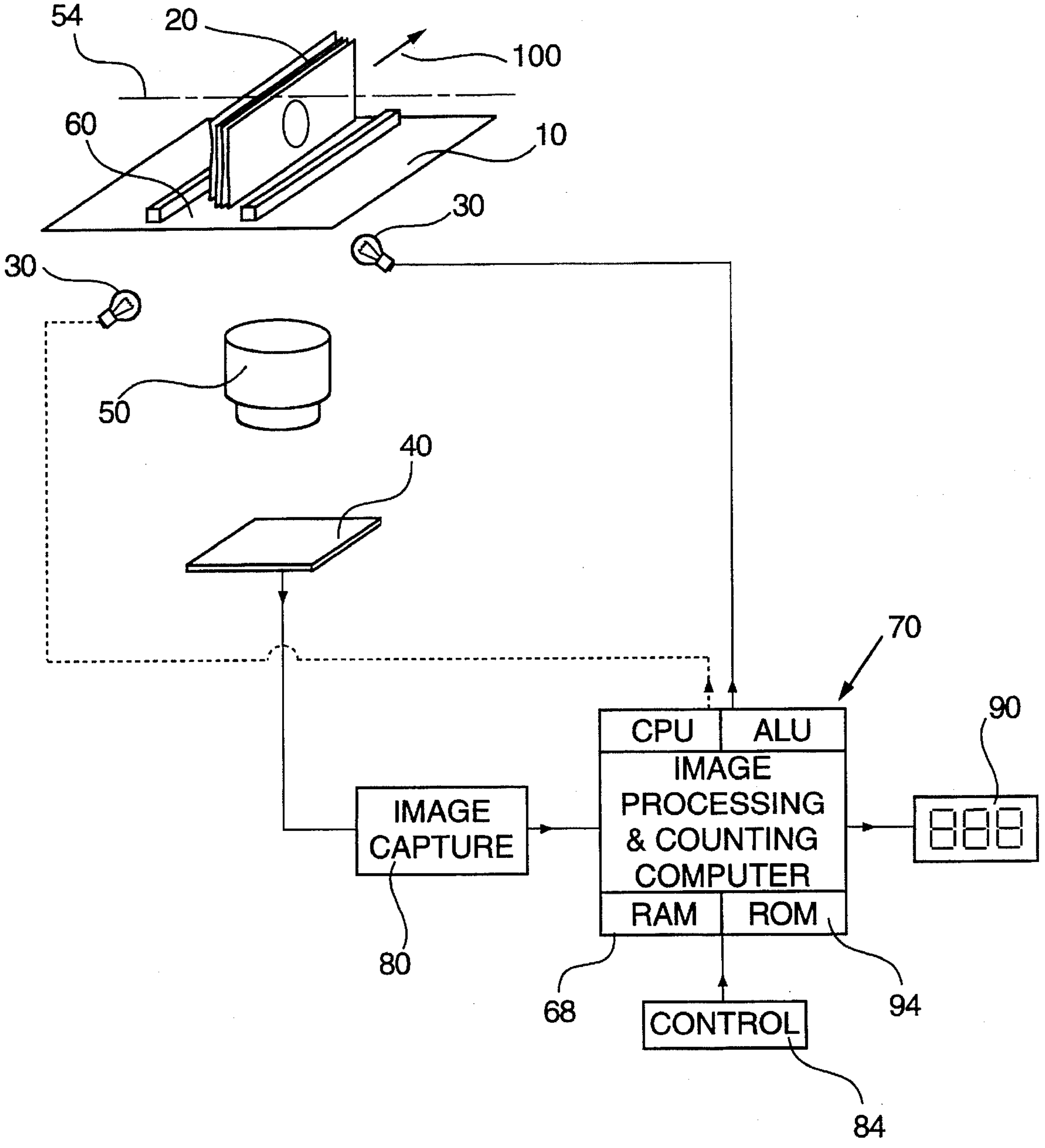
FIG. 1 is a simplified block diagram of sheet counting apparatus constructed and operative in accordance with a preferred embodiment of the present invention.

FIG. 1 is a simplified block diagram of apparatus for counting stacked objects. The apparatus includes a support 10 for the stack of objects 20 to be counted, at least one light source 30, and a light sensor 40, such as a matrix-CCD or a line-CCD, operatively associated with a lens 50 for converting the image of the stack into electric signals. The optical apparatus may, optionally, include mirrors (not shown) for such functions as enlargement, focussing and/or changing direction.

The axis of the stack is indicated by reference number 54.

Alternatively, the support 10 may be omitted. The apparatus may optionally be portable such that counting of objects takes place by transporting the counting apparatus to the objects rather than by transporting the objects to the counting apparatus.

It is appreciated, however, that the support, if provided, may perform one or more of the following functions:

a. Alignment of the stack.

b. Separation of the stack, e.g. by providing a diagonally oriented support on which the stack is placed on its side such that the edges of the stack become separated due to the diagonal.

c. The support may serve as a track along which the stack is moved.

d. The support may be operative to electrostatically charge the stack, thereby to enhance separation of the objects. For example, the support may comprise a capacitor.

Depending on the optical characteristics of the lens and the CCD elements, magnification may be provided, so as to provide a suitable picture resolution, such as at least 5 pixels for the shortest dimension of the object and for the average gap between objects. One suitable depth of field value is about 5 mm. A suitable linear resolution is at least 500 dots per half-inch. The above numerical values are suitable for the specific equipment detailed below and are not intending to be limiting.

It is appreciated that a laser beam emitting device such as a laser diode or a He-Ne laser may be employed for light source 30 and an optical sensor suitable for sensing laser rays may be employed for sensor 40.

Preferably, the sensor and lens are disposed below the support 10 and the support 10 includes a transparent window 60 or a slit (not shown) through which the stack 20 can be imaged from below. The stack is placed on its side, preferably on its long side, and may optionally be manually guided along the long dimension of the transparent window 60, as indicated by arrow 100. In some applications, motion along arrow 100 may not require manual guidance since the stack is in motion, e.g. is travelling along a conveyor belt, due to processes other than counting which are being performed on the stack or with the aid of the stack.

Alternatively, the CCD comprises a line-CCD which can be moved parallel, or at any other suitable angle, to the long dimension of the transparent window. Preferably, however, the CCD comprises a matrix-CCD and neither the stack nor the matrix-CCD are moved during imaging.

The output of the sensor is fed to an image capturing unit 80 which transforms the analog data captured by the light sensor 40 in digital form to a RAM 68. An image processing and counting computer 70, associated with a conventional control device 84, analyzes the picture stored in the RAM in order to discern or "count" the number of objects in the stack. The counting capability may be implemented in software which is held in a ROM 94.

The result of "counting" the number of objects in the stack is displayed on a display device 90 such as an LCD. Optionally, diagnostic statistics or warning indications may also be displayed.

It is appreciated that information related to the counting process other than the number of objects may be derived and displayed. For example, it may be desirable to provide an indication of poor quality objects, such as bills.

In FIG. 1, illumination is provided, however, alternatively, only natural illumination may be employed. Furthermore, any suitable type of artificial illumination may be employed. Optionally, if artificial illumination is employed, the natural illumination is blocked out as by opaque blocking screens.

One or more light sources may be employed. Each of the one or more beams provided by the one or more light sources may be any color of light, or may have a selectable plurality of colors as by provision of a plurality of filters. Each beam may be focussed or divergent. The angle of each beam relative to the stack may be any fixed angle or may be varied by the user. The light itself may be coherent or non-coherent. Filters may be employed to control the wavelength of the light and/or the polarization of the light.

Optionally, the objects in the stack are processed so as to minimize the probability that two objects overlie one another and are consequently perceived as being a single object. For example, a plurality of apertures may be provided in the window through which airflows or air jets access the objects in order to enhance the separation thereof. Alternatively or in addition, the objects may be electrostatically charged such that they tend to repel one another and become separated from one another. Alternatively or in addition, a mechanical device may be provided to grip one side of the stack, typically the side opposite the side which is to be imaged, which has the effect of separating the edges of the objects which lie along the side of the stack which is to be imaged.

It is appreciated that the above two examples of how to minimize the probability of overlying objects are only examples and are not intended to be limiting.

Figure 2:
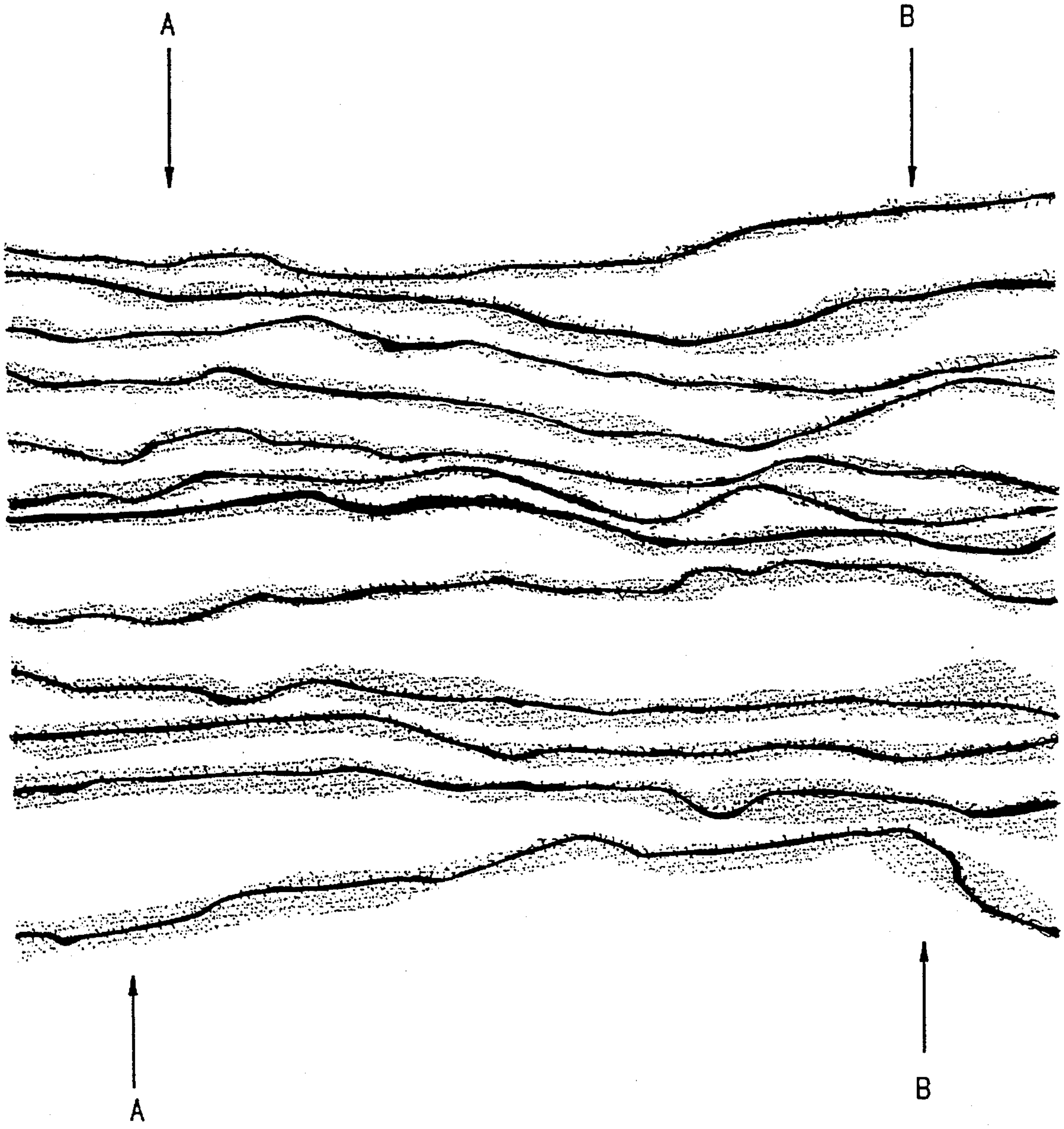
FIG. 2 is an example of a negative image of stacked sheet portions.

FIG. 2 is an example of a negative image of stacked sheet portions.

As seen, the sheet edges are non-uniform, which may be due to material wear, bent sheets, torn sheets, folded sheets, the tendency of paper to adopt a wave-like configuration, and other factors. Therefore, different lines drawn perpendicular to the imaged edges create different sequences of intersection points with the images of the sheets. The sequences may differ as to the distances between corresponding intersection points and/or even as to the number of intersection points. For example, the bottom two intersection points on line A in FIG. 2 would probably correspond to a single intersection point on line B due to the lack of distance between the bottom two sheets in FIG. 2, at the location of line B.

For this reason, according to a preferred embodiment of the present invention, a two dimensional image of the stack is provided, or alternatively the stack is imaged with a linear sensor at a plurality of locations along the sheets, such as more than 400 locations. For example, the stack of FIG. 2 may be imaged at a plurality of locations including line A and line B.

Figure 3:
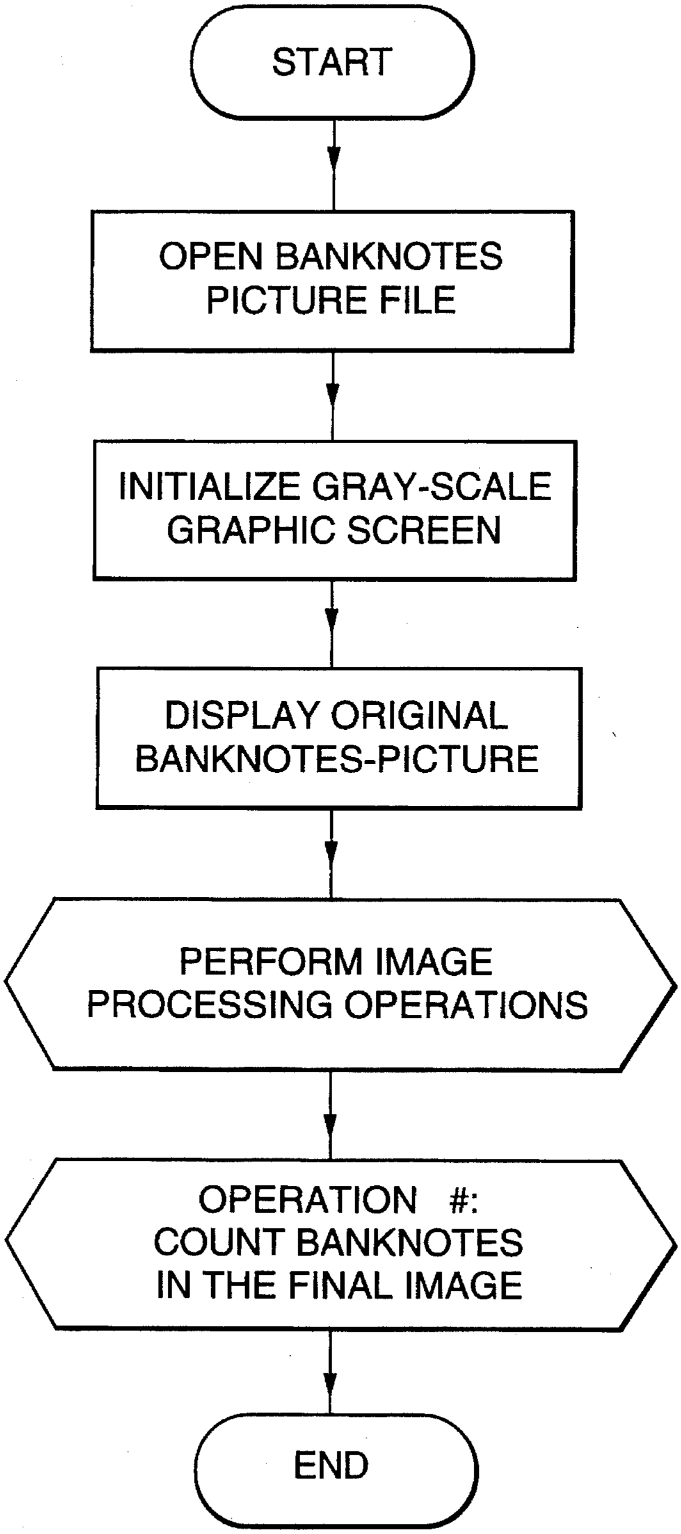
FIG. 3 is a logic diagram of the operation of the image processing and counting computer of FIG. 1.

FIG. 3 is a logic diagram of the operation of the comparing and counting computer of FIG. 1, which includes image processing and counting.

Image processing typically includes noise removal, sharpening, edge enhancement, filtering, and/or threshold limiting, any or all of which may be based on conventional methods such as those described in Pratt, W. K, *Digital image processing,* Second Ed., Wiley 1991, New York. A preferred image processing method is described below with reference to FIG. 4.

A preferred counting method is described below with reference to FIG. 5.

Figure 4:
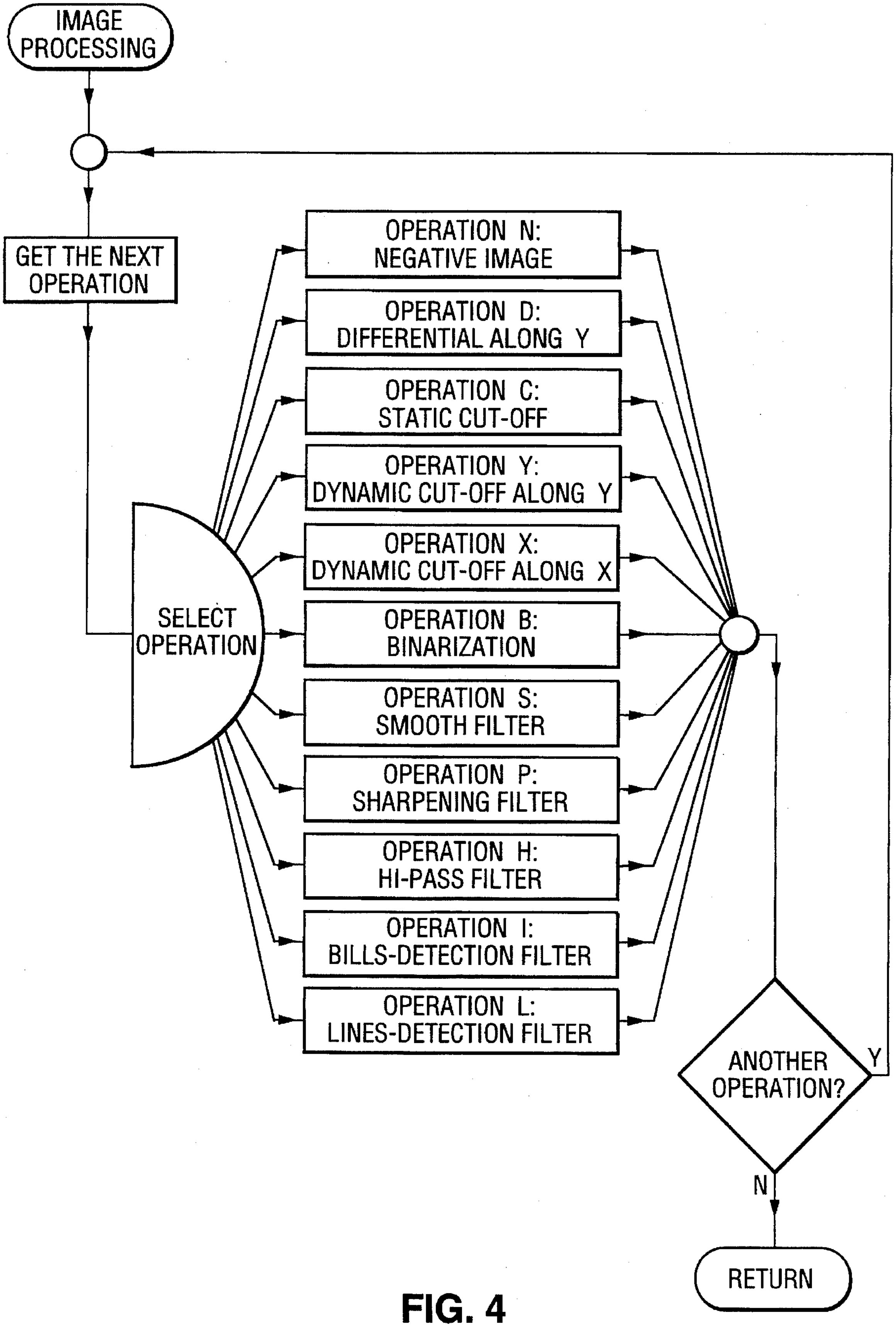
FIG. 4 is a flowchart illustration of a method for implementing the image processing step of FIG. 3 based on selection of an appropriate sequence of image processing operations.

FIG. 4 is a flowchart illustration of a method for implementing the image processing step of FIG. 3 based on selection of an appropriate sequence of image processing operations from among a set of image processing "primitives". The set of image processing "primitives" illustrated in FIG. 4 includes:

a. a negative imaging operation N, b. a differential operation D along columns to emphasize changes between bills and background, c. a static cut-off operation C which reduces noise using a threshold value set according to image brightness and contrast, d. a dynamic cut-off operation X to reduce noise along rows (banknotes), e. a dynamic cut-off operation Y to reduce noise between rows (banknotes), f. a binarization operation B, g. a smoothing operation S to reduce high-frequency noise, h. a sharpening edge-enhancing operation P, i. a hi-pass filtering operation H, j. a thick line detecting filtering operation I for emphasizing banknote images; and k. a line-detecting filtering operation L.

Suitable sequences of these image processing operations include: SSCDBS, SCPS, SIY, SIX, or simply C.

It is appreciated that a suitable image processing sequence need not be composed only of operations S, C, D, B, P, I, Y. A suitable image processing sequence may include other conventional image processing operations and/or the remaining image processing operations referred to in Appendix A and in FIG. 4, namely H (high pass filter), L (line detection filter), B (image binarization), N (negativing of image).

Figure 5:
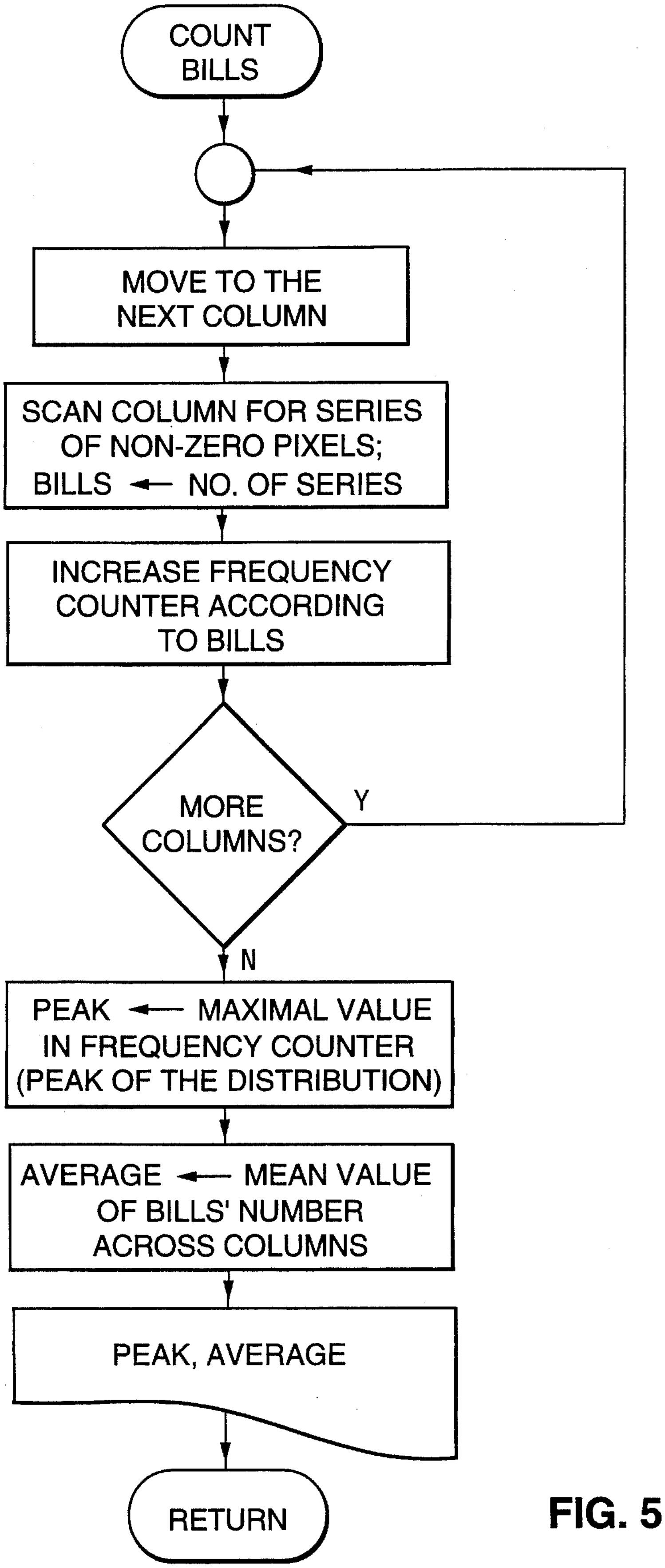
FIG. 5 is a flowchart illustration of a preferred method for implementing the sheet counting step of FIG. 3.

FIG. 5 is a flowchart illustration of a preferred method for implementing the sheet counting step of FIG. 3. Each column is searched for sequences of non-zero pixels. The number of such sequences is termed "bills" in FIG. 5. A histogram is constructed for "bills". The output of the process is an indication of the central tendency of the histogram such as the modal value (peak) thereof and/or the mean value thereof.

Figure 6:
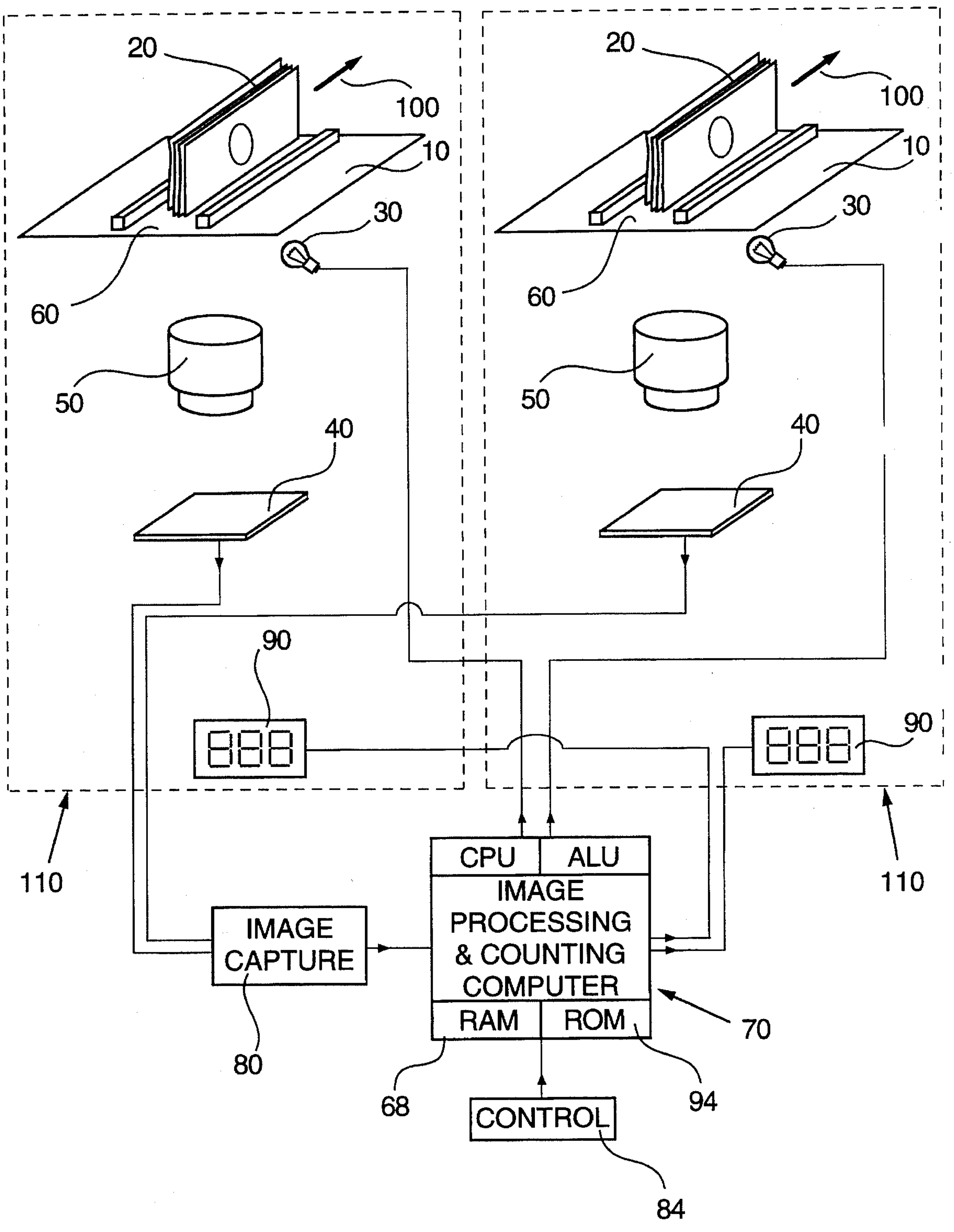
FIG. 6 is a simplified block diagram of a modification of the sheet counting apparatus of FIG. 1 which is operative to count a plurality of stacks of objects.

FIG. 6 is a simplified block diagram of a modification of the sheet counting apparatus of FIG. 1 which is operative to count a plurality of stacks of objects, even simultaneously. As shown, the apparatus of FIG. 6 is similar to the apparatus of FIG. 1 except that image processing and counting computer 70, image capturing unit 80 and control unit 84 are associated with a plurality of stack inspecting subunits 110, only two of which are illustrated. Each stack inspecting subunit typically comprises a support 10, a light source 30, a light sensor 40, a lens 50, and a display device 90.

Appendix A is a computer listing of a program entitled EZ_MONEY.PAS, a program which implements a banknote counting method operative in accordance with a preferred embodiment of the present invention.

The program employs several image processing methods to count banknotes in a picture file.

The picture file is an image which may be captured using a CORTEX frame grabber. The frame resolution is 512×512 pixels×256 gray levels/pixel. The program uses MODEX, a public domain software package written by Matt Pritchard. A computer listing of MODEX, entitled MODEX.ASM, is appended hereto and is referenced Appendix B. MODEX is employed as a graphics package, in order to process and display a 256 gray level picture, since this ability is not supported by the Turbo Pascal 6.0 Graphics Unit.

The program uses a subset of the MODEX graphics routines to handle two VGA pages, one being the source of the image processing operation and the other being the destination thereof. The program sets and gets pixel values and prints text.

The program uses the MODEX screen resolution, 320H×400V, which is smaller than the CORTEX image resolution but is sufficient in order to display the essential part of the image which stores the image of the banknotes to be counted.

To use the program of Appendix A to count a stack of banknotes, such as a stack of approximately one dozen Bank of Israel 20 New Sheqel denomination notes, the following equipment may be employed:

Hardware:

Computer—PC 386DX (40 Mhz, 128K Cache, 4 MB RAM, 340 MB hard disk, SVGA monitor).

Graphics card—Trident 8900CL (SVGA), 1 MB RAM onboard (manufactured by JUKO Electronics Industrial Co. Ltd. 208-770000-00A, Taiwan).

Frame grabber card—CORTEX-I, 256 Gray levels, 512H×512V resolution in CCIR/PAL mode (manufactured by Imagenation Corp., P.O. BOX 84568, Vancouver Wash. 98684-0568, USA).

Video camera—JAVELIN JE-7442 Hi-Resolution ⅔" CCD camera (manufactured by JAVELIN Electronics, 19831 Magellan Dr., Torrance Calif. 90502-1188, USA).

Lens—Micro-Nikkor 55 mm Macro lens (manufactured by NIKON Corp., Fuji Bldg., 2–3, Marunouchi 3-chome, Chiyoda-ku, Tokyo 100, JAPAN).

Camera accessories—Cosmicar x2 C-Mount lens TV Extender, Video Camera tripod.

Software:

MS-DOS 6.2 (by MicroSoft Corp.).

Turbo Assembler 3.0 (by Borland International, Inc.)

Turbo Pascal 6.0 (by Borland International, Inc).

CORTEX frame grabber software (by Imagenation Corp).

MODEX SVGA graphics library (author: Matt Pritchard, P. 0. B. 140264, Irving, Tex. 75014-0264, USA; on Fido NET ECHO Conference: 80xxx), the listing of which is provided herein as Appendix B;

EZ_Money—TurboPascal version counting program whose listing is appended hereto as appendix A.

Bills-counting processes, the text files of which are set forth within the above description under the captions COUNT_1. OPR, . . . COUNT_5.OPR.

A preferred method for counting notes, using the above equipment, is as follows:

1. Install the CORTEX frame grabber card inside the computer.
2. Install CORTEX software in C:\BANKNOTE directory.
3. Generate digital files whose contents are identical to the computer listings of Appendices A and B and name these files EZ_MONEY.PAS and MODEX.ASM respectively. Put EZ_MONEY.PAS and MODEX-.ASM into C:\BANKNOTE directory.
4. Compile MODEX.ASM using Turbo Assembler 3.0 in order to create MODEX.OBJ.
5. Compile EZ_MONEY.PAS and link it to MODEX-.OBJ using Turbo Pascal 6.0.
6. Mount the Micro Nikkor lens onto the Javelin camera with the Cosmicar TV Extender.
7. Attach the Javelin camera to the tripod and connect the camera video output to the CORTEX card input.
8. Place the stack of banknotes such that the stack's side (the edges of the bills) is in the viewing field of the camera.
9. Focus the lens on the bills' edges: change aperture opening to match the environment luminance which may, for example, be ambient room light.
10. Run CORTEX utility program to grab the banknotes image to a CORTEX image file format, using the command C:\BANKNOTE>UTILITY\GRAB.COM BANKNOTE.PIC.
11. Run EZ_MONEY counting program on the default BANKNOTE.PIC image file by:
    a. Interactive running (i.e. C:\BANKNOTE) EZ_MONEY); or
    b. Running using any one of the counting processes, COUNT_i.OPR to COUNT_5.OPR, which are as follows:

```
COUNT_1.OPR:
BANKNOTE.PIC
SSCDBS#
COUNT_2.OPR:
BANKNOTE.PIC
SCPS#
COUNT_3.OPR:
BANKNOTE.PIC
SIY#
COUNT_4.OPR:
BANKNOTE.PIC
SIX#
COUNT_5.OPR:
BANKNOTE.PIC
C#
```

For example, to run the EZ_MONEY counting program using the first counting process, type: C:\BANKNOTE>EZ_MONEY COUNT_i.OPR.

The five counting processes listed above are sequences including one or more image processing operations, referred to in Appendix A and in FIGS. 3 and 4 as S, I, X, Y, C, P and D, and also including a counting process # which is operative to count banknotes in each column and give, as a result, the most frequent count.

It is appreciated that the above image processing operations can be combined into counting processes other than COUNT_1.OPR, . . . , COUNT_5.0PR. It is also appreciated that the above set of image processing combinations may be augmented by other conventional image processing operations such as but not limited to the following image processing operations which are referred to in Appendix A and in FIG. 4:

H (high pass filter), L (line detection filter), B (image binarization), N (negativing of image).

Preferably, at least one of the image processing operations employed operates on a multipixel area such as a 3×3 pixel matrix or a 3×5 pixel matrix, rather than operating on one pixel at a time.

Optionally, a neural network or other learning mechanism may be employed such that the counting apparatus shown and described herein may be trained to count correctly.

Alternatively, all five of the counting processes may be employed and the results thereof combined, as by a weighted average, to determine a final result.

The number of banknotes in the stack is displayed on the screen or is recorded on the counting-algorithm file, if supplied. The result is the 'peak' value; in addition, the 'average' value is written.

For example, when the negative of the banknote stack image of FIG. 2 was processed, the result was found to be 12.

The present invention is described herein in the context of a banknote counting application as for a cash register, automatic cash withdrawal device or other banknote handling device, in a bank, postal facility, supermarket, casino, transportation facility or household use. However, it is appreciated that the embodiments shown and described herein may also be useful for counting other objects, and particularly flat, stacked objects such as stacks of cardboard sheets, forms, bills, films, plates, metal foils, cards, and pages photocopied or to be photocopied by a photocopier. The counting device may, optionally, be portable and may be either battery-powered or powered by connection to an electric outlet.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

APPENDIX A

{ COPYRIGHT © 1994, by: Charlie S. Antebi & Lior Goldenberg }

```
Program EZ_Money(input,output);
Uses Crt;

{$L modex.obj}        { This file is the external ModeX Library .OBJ }
{$F+}

        { Mode Setting Routines }

Function SET_MODEX (Mode:integer) : Integer; external;

        { Graphics Primitives }

Procedure CLEAR_VGA_SCREEN (Color:integer); external;
Procedure SET_POINT (Xpos,Ypos,Color : integer); external;
Function READ_POINT (Xpos,Ypos:integer) : integer; external;
Procedure DRAW_LINE (Xpos1,Ypos1,Xpos2,Ypos2,Color:integer); external;

        { VGA DAC Routines }

Procedure SET_DAC_REGISTER (RegNo,Red,Green,Blue:integer); external;

        { Text Display Routines }

Procedure PRINT_STR (Var Text;MaxLen,Xpos,Ypos,ColorF,ColorB:integer);
        external;

        { Page and Window Control Routines }

Procedure SET_ACTIVE_PAGE (PageNo:integer); external;
Procedure SET_DISPLAY_PAGE (PageNo:integer); external;

        { Sprite and VGA memory -> Vga memory Copy Routines }

Procedure COPY_PAGE (SourcePage,DestPage:integer); external;

{$F-}

Const
```

```
  CR = Chr(13);
  ESC = Chr(27);
  FRAME_Y = 512;
  FRAME_X = 512;
  FILTER_SIZE = 20;
  COMMAND_LENGTH = 20;
  MAX_BILLS = 256;
  XMAX = 320;
  YMAX = 400;
  DISPLAY_MODE = 1; {  320H x 400V }
  DATA_FRAME = 0;
  WORK_FRAME = 1;

Type
  Filter_Matrix= Array[0..FILTER_SIZE-1,0..FILTER_SIZE-1] of Integer;

Var
  command_string: String[COMMAND_LENGTH];
  command_index: Integer;
  peak: Integer;

        { Error Handler - Returns to Text Mode & Displays Error }

Procedure MESSAGE(s : string);
  Begin
    asm
      mov ah,0
      mov al,3
      int 10h
    end;
  WriteLn(s);
  Halt(0);
END;

        { MAIN ROUTINE - Run Through Counting and Exit }

Procedure Beep;
Var
  i:  Integer;
Begin
```

```
 Sound(1000);
 For i:=0 to 16000 Do;
  NoSound;
End;

Procedure Gray_Scale;
Var
 i: Integer;
Begin
 For i:=0 to 255 do
  SET_DAC_REGISTER (i,i div 4,i div 4,i div 4);
End;

Procedure Display_Frame(filename: String; skip_lines: Integer);
Var
 frame_file: Text;
 x,y: Integer;
 c: Char;

Begin
 Assign(frame_file,filename);
 Reset(frame_file);

 For y:=0 to FRAME_Y-1 do
  For x:=0 to FRAME_X-1 do
  Begin
   Read(frame_file,c);
   If y>=skip_lines Then
      SET_POINT(x,y-skip_lines,Ord(c));
  End;

 Close(frame_file);
End;

Procedure Negate_Frame;
Var
 x,y,n: Integer;
Begin
 SET_DISPLAY_PAGE(WORK_FRAME);
 For y:=0 to YMAX-1 do
```

```
    For x:=0 to XMAX-1 do
    Begin
      n:=255-READ_POINT(x,y);
      SET_ACTIVE_PAGE(WORK_FRAME);
      SET_POINT(x,y,n);
      SET_ACTIVE_PAGE(DATA_FRAME);
    End;
End;

Procedure Cutoff_Frame(n: Integer);
Var
  x,y,v: Integer;
Begin
  SET_DISPLAY_PAGE(WORK_FRAME);
  For y:=0 to YMAX-1 do
    For x:=0 to XMAX-1 do
    Begin
      v:=READ_POINT(x,y);
      If v<=n Then
          v:=0;
      SET_ACTIVE_PAGE(WORK_FRAME);
      SET_POINT(x,y,v);
      SET_ACTIVE_PAGE(DATA_FRAME);
    End;
End;

Procedure Dynamic_Y_Cutoff_Frame(r: Real);
Var
  x,y,v,n: Integer;
Begin
  SET_DISPLAY_PAGE(WORK_FRAME);
  For y:=0 to YMAX-1 do
  Begin
    v:=0;
    For x:=0 to XMAX-1 do
      If v<READ_POINT(x,y) Then
          v:=READ_POINT(x,y);
    n:=Round(v*r);
    For x:=0 to XMAX-1 do
    Begin
```

```
    v:=READ_POINT(x,y);
    If v<=n Then
       v:=0;
    SET_ACTIVE_PAGE(WORK_FRAME);
    SET_POINT(x,y,v);
    SET_ACTIVE_PAGE(DATA_FRAME);
  End;
 End;
End;

Procedure Dynamic_X_Cutoff_Frame(r: Real);
Var
 x,y,v,n: Integer;
Begin
 SET_DISPLAY_PAGE(WORK_FRAME);
 For x:=0 to XMAX-1 do
 Begin
  v:=0;
  For y:=0 to YMAX-1 do
   If v<READ_POINT(x,y) Then
      v:=READ_POINT(x,y);
  n:=Round(v*r);
  For y:=0 to YMAX-1 do
  Begin
   v:=READ_POINT(x,y);
   If v<=n Then
      v:=0;
   SET_ACTIVE_PAGE(WORK_FRAME);
   SET_POINT(x,y,v);
   SET_ACTIVE_PAGE(DATA_FRAME);
  End;
 End;
End;

Procedure Bin_Frame(n: Integer);
Var
 x,y,v: Integer;
Begin
 SET_DISPLAY_PAGE(WORK_FRAME);
 For y:=0 to YMAX-1 do
```

```
   For x:=0 to XMAX-1 do
   Begin
    v:=READ_POINT(x,y);
    If v<=n Then
        v:=0
    Else
        v:=255;
    SET_ACTIVE_PAGE(WORK_FRAME);
    SET_POINT(x,y,v);
    SET_ACTIVE_PAGE(DATA_FRAME);
   End;
End;

Procedure Diff_Frame;
Var
 x,y,n: Integer;
Begin
 SET_DISPLAY_PAGE(WORK_FRAME);
 For y:=0 to YMAX-1 do
  For x:=0 to XMAX-1 do
  Begin
    n:=(READ_POINT(x,y+1)-READ_POINT(x,y-1)+255) div 2;
    SET_ACTIVE_PAGE(WORK_FRAME);
    SET_POINT(x,y,n);
    SET_ACTIVE_PAGE(DATA_FRAME);
  End;
End;

Function Byte_Bound(v: Integer): Byte;
Begin
 Byte_Bound:=v;
 If v<0 Then
  Byte_Bound:=0;
 If v>255 Then
  Byte_Bound:=255;
End;

Procedure Filter_Frame(devider: Integer; f: Filter_Matrix; m,n: Integer);
Var
 x,y,i,j: Integer;
```

```
 v: Integer;
Begin
 SET_DISPLAY_PAGE(WORK_FRAME);
 For y:=0 to YMAX-m do
  For x:=0 to XMAX-n do
  Begin
   v:=0;
   For i:=0 to m-1 do
     For j:=0 to n-1 do
      v:=v+f[i,j] * READ_POINT(x+j,y+i);
   v:=Byte_Bound(v div devider);
   SET_ACTIVE_PAGE(WORK_FRAME);
   SET_POINT(x+(n div 2),y+(m div 2),v);
   SET_ACTIVE_PAGE(DATA_FRAME);
  End
End;

Procedure Smooth_Frame;
Var
 f: Filter_Matrix;
 i,j: Integer;
Begin
 For i:=0 to FILTER_SIZE-1 do
  For j:=0 to FILTER_SIZE-1 do
   f[i,j]:=1;
 Filter_Frame(9,f,3,3);
End;

Procedure Sharp_Frame;
Var
 f: Filter_Matrix;
 i,j: Integer;
Begin
 f[0,0]:= 1;  f[0,1]:= 1;  f[0,2]:= 1;
 f[1,0]:= 1;  f[1,1]:=-2;  f[1,2]:= 1;
 f[2,0]:=-1;  f[2,1]:=-1;  f[2,2]:=-1;
 Filter_Frame(1,f,3,3);
End;

Procedure Line_Detection_Frame;
```

```
Var
 f: Filter_Matrix;
 i,j: Integer;
Begin
 f[0,0]:=-1;  f[0,1]:=-1;  f[0,2]:=-1;
 f[1,0]:= 2;  f[1,1]:= 2;  f[1,2]:= 2;
 f[2,0]:=-1;  f[2,1]:=-1;  f[2,2]:=-1;
 Filter_Frame(1,f,3,3);
End;

Procedure Hi_Pass_Frame;
Var
 f: Filter_Matrix;
 i,j: Integer;
Begin
 f[0,0]:= 0;  f[0,1]:=-1;  f[0,2]:= 0;
 f[1,0]:=-1;  f[1,1]:= 5;  f[1,2]:=-1;
 f[2,0]:= 0;  f[2,1]:=-1;  f[2,2]:= 0;
 Filter_Frame(1,f,3,3);
End;

Procedure Bill_Detection_Frame;
Var
 f: Filter_Matrix;
 i,j: Integer;
Begin
 f[0,0]:=-2;  f[0,1]:=-3;  f[0,2]:=-2;
 f[1,0]:=-1;  f[1,1]:=-1;  f[1,2]:=-1;
 f[2,0]:=10;  f[2,1]:=15;  f[2,2]:=10;
 f[3,0]:=-1;  f[3,1]:=-1;  f[3,2]:=-1;
 f[4,0]:=-2;  f[4,1]:=-3;  f[4,2]:=-2;
 Filter_Frame(10,f,5,3);
End;

Function Select_Process: Char;
Var
 c: Char;
 menu_line: Packed Array [1..40] of Char;
Begin
 Copy_Page(DATA_FRAME,WORK_FRAME);
```

```
  Beep;
 End;
 If (command_string<>'') Then
  COPY_PAGE(WORK_FRAME,DATA_FRAME)
 Else
  If (ReadKey=CR) Then
   COPY_PAGE(WORK_FRAME,DATA_FRAME);

 SET_DISPLAY_PAGE(DATA_FRAME);
End;

Function Count_Bills: Real;
Var
 x,y,i,j: Integer;
 bills,ave,sum: Integer;
 count: Array [0..MAX_BILLS] of Integer;
Begin
 For i:=0 to MAX_BILLS do
  count[i]:=0;
 For x:=FILTER_SIZE div 2 to XMAX-(FILTER_SIZE div 2) do
 Begin
  bills:=0;
  For y:=FILTER_SIZE div 2 to YMAX-(FILTER_SIZE div 2) do
   If (READ_POINT(x,y+1)>0) and (READ_POINT(x,y)=0) Then
      bills:=bills+1;
  count[bills]:=count[bills]+1;
 End;
 CLEAR_VGA_SCREEN(0);
 peak:=0;
 ave:=0;
 sum:=0;
 For i:=0 to MAX_BILLS do
 Begin
  DRAW_LINE(i+i,YMAX,i+i,YMAX-count[i]-1,64);
  If (i mod 10)=0 Then
   SET_POINT(i+i,YMAX-1,255);

  If count[i]>count[peak] Then
   peak:=i;
  ave:=ave+i*count[i];
```

```
  sum:=sum+count[i];
 End;
 Count_Bills:=ave / sum;
End;

Var
 frame_file: String;
 s: Char;
 i,j,k: integer;
 peaks,bills: String;
 command: Text;

Begin
 command_index:=0;

 If ParamCount=0 Then
 Begin
  Write('Frame File < BANKNOTE.PIC > :');
  Readln(frame_file);
  If frame_file='' Then
   frame_file:='BANKNOTE.PIC';
  Write('Command String ? ');
  Readln(command_string);
 End
 Else
 Begin
  Assign(command,ParamStr(1));
  Reset(command);
  Readln(command,frame_file);
  Readln(command,command_string);
 End;
 If command_string<>'' Then
  command_string[Length(command_string)+1]:='#';

 If SET_MODEX(DISPLAY_MODE) = 0 Then
  MESSAGE('Unable to SET_MODEX ');
 CLEAR_VGA_SCREEN(0);
 Gray_Scale;

 Display_Frame(FRAME_FILE,80);
```

```
 s:=Select_Process;
 While s<>ESC Do
 Begin
  Process_Frame(s);
  s:=Select_Process;
 End;

 Str(Count_Bills:10:5,bills);
 Str(peak,peaks);
 If ParamCount<>0 Then
 Begin
  Close(command);
  Append(command);
  Writeln(command,bills);
  Writeln(command,peak);
  Close(command);
 End
 Else
  s:=ReadKey;
 MESSAGE('EZ_Money IS FINISHED: '+ peaks + ' bills counted.');
End.
```

APPENDIX B

```
;==========================================================
; MODEX.ASM - A Complete Mode X Library
;
; Version 1.04 Release, 3 May 1993, By Matt Pritchard
; With considerable input from Michael Abrash
;
; The following information is donated to the public domain in
; the hopes that save other programmers much frustration.
;
; If you do use this code in a product, it would be nice if
; you include a line like "Mode X routines by Matt Pritchard"
; in the credits.
;
; ==========================================================
;
; All of this code is designed to be assembled with MASM 5.10a
; but TASM 3.0 could be used as well.
;
; The routines contained are designed for use in a MEDIUM model
; program. All Routines are FAR, and is assumed that a DGROUP
; data segment exists and that DS will point to it on entry.
;
; For all routines, the AX, BX, CX, DX, ES and FLAGS registers
; will not be preserved, while the DS, BP, SI and DI registers
; will be preserved.
;
; Unless specifically noted, All Parameters are assumed to be
; "PASSED BY VALUE". That is, the actual value is placed on
; the stack. When a reference is passed it is assumed to be
; a near pointer to a variable in the DGROUP segment.
;
; Routines that return a single 16-Bit integer value will
; return that value in the AX register.
;
; This code will *NOT* run on an 8086/8088 because 80286+
; specific instructions are used. If you have an 8088/86
; and VGA, you can buy an 80386-40 motherboard for about
; $160 and move into the 90's.
;
; This code is reasonably optimized: Most drawing loops have
```

```
; been unrolled once and memory references are minimized by
; keeping stuff in registers when possible.
;
; Error Trapping varies by Routine. No Clipping is performed
; so the caller should verify that all coordinates are valid.
;
; Several Macros are used to simplify common 2 or 3 instruction
; sequences. Several Single letter Text Constants also
; simplify common assembler expressions like "WORD PTR".
;
; ------------------ Mode X Variations ------------------
;
;  Mode #  Screen Size    Max Pages   Aspect Ratio (X:Y)
;
;   0     320 x 200     4 Pages       1.2:1
;   1     320 x 400     2 Pages       2.4:1
;   2     360 x 200     3 Pages       1.35:1
;   3     360 x 400     1 Page        2.7:1
;   4     320 x 240     3 Pages         1:1
;   5     320 x 480     1 Page          2:1
;   6     360 x 240     3 Pages      1.125:1
;   7     360 x 480     1 Page        2.25:1
;
; -------------------- The Legal Stuff ------------------
;
; No warranty, either written or implied, is made as to
; the accuracy and usability of this code product. Use
; at your own risk. Batteries not included. Pepperoni
; and extra cheese available for an additional charge.
;
; ----------------------- The Author --------------------
;
; Matt Pritchard is a paid programmer who'd rather be
; writing games. He can be reached at: P.O. Box 140264,
; Irving, TX 75014 USA. Michael Abrash is a living
; god, who now works for Bill Gates (Microsoft).
;
; -------------------- Revision History -----------------
; 4-12-93: v1.02 - SET_POINT & READ_POINT now saves DI
;         SET_MODEX now saves SI
```

```
; 5-3-93:  v1.04 - added LOAD_DAC_REGISTERS and
;        READ_DAC_REGISTERS.  Expanded CLR Macro
;        to handle multiple registers
;

   PAGE    255, 132

   .MODEL Medium
   .286

   ; ===== MACROS =====

   ; Macro to OUT a 16 bit value to an I/O port

OUT_16 MACRO Register, Value
   IFDIFI <Register>, <DX>        ; If DX not setup
      MOV     DX, Register        ; then Select Register
   ENDIF
   IFDIFI <Value>, <AX>           ; If AX not setup
      MOV     AX, Value           ; then Get Data Value
   ENDIF
      OUT     DX, AX              ; Set I/O Register(s)
ENDM

   ; Macro to OUT a 8 bit value to an I/O Port

OUT_8 MACRO Register, Value
   IFDIFI <Register>, <DX>        ; If DX not setup
      MOV     DX, Register        ; then Select Register
   ENDIF
   IFDIFI <Value>, <AL>           ; If AL not Setup
      MOV     AL, Value           ; then Get Data Value
   ENDIF
      OUT     DX, AL              ; Set I/O Register
ENDM

   ; macros to PUSH and POP multiple registers

PUSHx MACRO R1, R2, R3, R4, R5, R6, R7, R8
   IFNB <R1>
```

```
    PUSH   R1          ; Save R1
    PUSHx  R2, R3, R4, R5, R6, R7, R8
  ENDIF
ENDM

POPx MACRO R1, R2, R3, R4, R5, R6, R7, R8
  IFNB <R1>
    POP    R1          ; Restore R1
    POPx   R2, R3, R4, R5, R6, R7, R8
  ENDIF
ENDM

  ; Macro to Clear Registers to 0

CLR MACRO Register, R2, R3, R4, R5, R6
  IFNB <Register>
    XOR    Register, Register     ; Set Register = 0
    CLR R2, R3, R4, R5, R6
  ENDIF
ENDM

  ; Macros to Decrement Counter & Jump on Condition

LOOPx MACRO Register, Destination
  DEC    Register          ; Counter--
  JNZ    Destination       ; Jump if not 0
ENDM

LOOPjz MACRO Register, Destination
  DEC    Register          ; Counter--
  JZ     Destination       ; Jump if 0
ENDM


  ; ===== General Constants =====

  False  EQU 0
  True   EQU -1
  nil    EQU 0
```

```
b      EQU BYTE PTR
w      EQU WORD PTR
d      EQU DWORD PTR
o      EQU OFFSET
f      EQU FAR PTR
s      EQU SHORT
?x4    EQU <?,?,?,?>
?x3    EQU <?,?,?>

; ===== VGA Register Values =====

VGA_Segment    EQU 0A000h  ; Vga Memory Segment

ATTRIB_Ctrl    EQU 03C0h  ; VGA Attribute Controller
GC_Index       EQU 03CEh  ; VGA Graphics Controller
SC_Index       EQU 03C4h  ; VGA Sequencer Controller
SC_Data        EQU 03C5h  ; VGA Sequencer Data Port
CRTC_Index     EQU 03D4h  ; VGA CRT Controller
CRTC_Data      EQU 03D5h  ; VGA CRT Controller Data
MISC_OUTPUT    EQU 03C2h  ; VGA Misc Register
INPUT_1        EQU 03DAh  ; Input Status #1 Register

DAC_WRITE_ADDR  EQU 03C8h  ; VGA DAC Write Addr Register
DAC_READ_ADDR   EQU 03C7h  ; VGA DAC Read Addr Register
PEL_DATA_REG    EQU 03C9h  ; VGA DAC/PEL data Register R/W

PIXEL_PAN_REG   EQU 033h   ; Attrib Index: Pixel Pan Reg
MAP_MASK        EQU 002h   ; Sequ Index: Write Map Mask reg
READ_MAP        EQU 004h   ; GC Index: Read Map Register
START_DISP_HI   EQU 00Ch   ; CRTC Index: Display Start Hi
START_DISP_LO   EQU 00Dh   ; CRTC Index: Display Start Lo

MAP_MASK_PLANE1 EQU 00102h  ; Map Register + Plane 1
MAP_MASK_PLANE2 EQU 01102h  ; Map Register + Plane 1
ALL_PLANES_ON   EQU 00F02h  ; Map Register + All Bit Planes

CHAIN4_OFF      EQU 00604h  ; Chain 4 mode Off
ASYNC_RESET     EQU 00100h  ; (A)synchronous Reset
SEQU_RESTART    EQU 00300h  ; Sequencer Restart
```

```
  LATCHES_ON      EQU 00008h  ; Bit Mask + Data from Latches
  LATCHES_OFF     EQU 0FF08h  ; Bit Mask + Data from CPU

  VERT_RETRACE    EQU 08h     ; INPUT_1: Vertical Retrace Bit
  PLANE_BITS      EQU 03h     ; Bits 0-1 of Xpos = Plane #
  ALL_PLANES      EQU 0Fh     ; All Bit Planes Selected
  CHAR_BITS       EQU 0Fh     ; Bits 0-3 of Character Data

  GET_CHAR_PTR    EQU 01130h  ; VGA BIOS Func: Get Char Set
  ROM_8x8_Lo      EQU 03h     ; ROM 8x8 Char Set Lo Pointer
  ROM_8x8_Hi      EQU 04h     ; ROM 8x8 Char Set Hi Pointer

  ; Constants Specific for these routines

  NUM_MODES       EQU 8       ; # of Mode X Variations

  ; Specific Mode Data Table format...

Mode_Data_Table STRUC
  M_MiscR         DB ?        ; Value of MISC_OUTPUT register
  M_Pages         DB ?        ; Maximum Possible # of pages
  M_XSize         DW ?        ; X Size Displayed on screen
  M_YSize         DW ?        ; Y Size Displayed on screen
  M_XMax          DW ?        ; Maximum Possible X Size
  M_YMax          DW ?        ; Maximum Possible Y Size
  M_CRTC          DW ?        ; Table of CRTC register values
Mode_Data_Table ENDS

  ; ===== DGROUP STORAGE NEEDED (42 BYTES) =====

  .DATA?

SCREEN_WIDTH    DW 0        ; Width of a line in Bytes
SCREEN_HEIGHT   DW 0        ; Vertical Height in Pixels

LAST_PAGE       DW 0        ; # of Display Pages
PAGE_ADDR       DW 4 DUP (0)  ; Offsets to start of each page

PAGE_SIZE       DW 0        ; Size of Page in Addr Bytes
```

```
DISPLAY_PAGE   DW 0      ; Page # currently displayed
ACTIVE_PAGE    DW 0      ; Page # currently active

CURRENT_PAGE   DW 0      ; Offset of current Page
CURRENT_SEGMENT DW 0     ; Segment of VGA memory

CURRENT_XOFFSET DW 0     ; Current Display X Offset
CURRENT_YOFFSET DW 0     ; Current Display Y Offset

CURRENT_MOFFSET DW 0     ; Current Start Offset

MAX_XOFFSET    DW 0      ; Current Display X Offset
MAX_YOFFSET    DW 0      ; Current Display Y Offset

CHARSET_LOW    DW 0, 0   ; Far Ptr to Char Set: 0-127
CHARSET_HI     DW 0, 0   ; Far Ptr to Char Set: 128-255

   .CODE

   ; ===== DATA TABLES =====

   ; Data Tables, Put in Code Segment for Easy Access
   ; (Like when all the other Segment Registers are in
   ; use!!) and reduced DGROUP requirements...

   ; Bit Mask Tables for Left/Right/Character Masks

Left_Clip_Mask     DB 0FH, 0EH, 0CH, 08H

Right_Clip_Mask    DB 01H, 03H, 07H, 0FH

   ; Bit Patterns for converting character fonts

Char_Plane_Data    DB 00H,08H,04H,0CH,02H,0AH,06H,0EH
                   DB 01H,09H,05H,0DH,03H,0BH,07H,0FH

      ; CRTC Register Values for Various Configurations

MODE_Single_Line:      ; CRTC Setup Data for 400/480 Line modes
      DW 04009H      ; Cell Height (1 Scan Line)
```

```
     DW  00014H     ; Dword Mode off
     DW  0E317H     ; turn on Byte Mode
     DW  nil        ; End of CRTC Data for 400/480 Line Mode

MODE_Double_Line:       ; CRTC Setup Data for 200/240 Line modes
     DW  04109H     ; Cell Height (2 Scan Lines)
     DW  00014H     ; Dword Mode off
     DW  0E317H     ; turn on Byte Mode
     DW  nil        ; End of CRTC Data for 200/240 Line Mode

MODE_320_Wide:          ; CRTC Setup Data for 320 Horz Pixels
     DW  05F00H     ; Horz total
     DW  04F01H     ; Horz Displayed
     DW  05002H     ; Start Horz Blanking
     DW  08203H     ; End Horz Blanking
     DW  05404H     ; Start H Sync
     DW  08005H     ; End H Sync
     DW  nil        ; End of CRTC Data for 320 Horz pixels

MODE_360_Wide:          ; CRTC Setup Data for 360 Horz Pixels
     DW  06B00H     ; Horz total
     DW  05901H     ; Horz Displayed
     DW  05A02H     ; Start Horz Blanking
     DW  08E03H     ; End Horz Blanking
     DW  05E04H     ; Start H Sync
     DW  08A05H     ; End H Sync
     DW  nil        ; End of CRTC Data for 360 Horz pixels

MODE_200_Tall:
MODE_400_Tall:          ; CRTC Setup Data for 200/400 Line modes
     DW  0BF06H     ; Vertical Total
     DW  01F07H     ; Overflow
     DW  09C10H     ; V Sync Start
     DW  08E11H     ; V Sync End/Prot Cr0 Cr7
     DW  08F12H     ; Vertical Displayed
     DW  09615H     ; V Blank Start
     DW  0B916H     ; V Blank End
     DW  nil        ; End of CRTC Data for 200/400 Lines

MODE_240_Tall:
```

```
MODE_480_Tall:       ; CRTC Setup Data for 240/480 Line modes
     DW 00D06H     ; Vertical Total
     DW 03E07H     ; Overflow
     DW 0EA10H     ; V Sync Start
     DW 08C11H     ; V Sync End/Prot Cr0 Cr7
     DW 0DF12H     ; Vertical Displayed
     DW 0E715H     ; V Blank Start
     DW 00616H     ; V Blank End
     DW nil        ; End of CRTC Data for 240/480 Lines

     ; Table of Display Mode Tables

MODE_TABLE:
     DW o MODE_320x200, o MODE_320x400
     DW o MODE_360x200, o MODE_360x400
     DW o MODE_320x240, o MODE_320x480
     DW o MODE_360x240, o MODE_360x480

     ; Table of Display Mode Components

MODE_320x200:        ; Data for 320 by 200 Pixels

     DB 063h       ; 400 scan Lines & 25 Mhz Clock
     DB 4          ; Maximum of 4 Pages
     DW 320, 200   ; Displayed Pixels (X,Y)
     DW 1302, 816  ; Max Possible X and Y Sizes

     DW o MODE_320_Wide, o MODE_200_Tall
     DW o MODE_Double_Line, nil

MODE_320x400:        ; Data for 320 by 400 Pixels

     DB 063h       ; 400 scan Lines & 25 Mhz Clock
     DB 2          ; Maximum of 2 Pages
     DW 320, 400   ; Displayed Pixels X,Y
     DW 648, 816   ; Max Possible X and Y Sizes

     DW o MODE_320_Wide, o MODE_400_Tall
     DW o MODE_Single_Line, nil
```

```
MODE_360x240:          ; Data for 360 by 240 Pixels

    DB  0E7h       ; 480 scan Lines & 28 Mhz Clock
    DB  3          ; Maximum of 3 Pages
    DW  360, 240   ; Displayed Pixels X,Y
    DW  1092, 728  ; Max Possible X and Y Sizes

    DW  o MODE_360_Wide, o MODE_240_Tall
    DW  o MODE_Double_Line , nil

MODE_360x480:          ; Data for 360 by 480 Pixels

    DB  0E7h       ; 480 scan Lines & 28 Mhz Clock
    DB  1          ; Only 1 Page Possible
    DW  360, 480   ; Displayed Pixels X,Y
    DW  544, 728   ; Max Possible X and Y Sizes

    DW  o MODE_360_Wide, o MODE_480_Tall
    DW  o MODE_Single_Line , nil

MODE_320x240:          ; Data for 320 by 240 Pixels

    DB  0E3h       ; 480 scan Lines & 25 Mhz Clock
    DB  3          ; Maximum of 3 Pages
    DW  320, 240   ; Displayed Pixels X,Y
    DW  1088, 818  ; Max Possible X and Y Sizes

    DW  o MODE_320_Wide, o MODE_240_Tall
    DW  o MODE_Double_Line, nil

MODE_320x480:          ; Data for 320 by 480 Pixels

    DB  0E3h       ; 480 scan Lines & 25 Mhz Clock
    DB  1          ; Only 1 Page Possible
    DW  320, 480   ; Displayed Pixels X,Y
    DW  540, 818   ; Max Possible X and Y Sizes

    DW  o MODE_320_WIDE, o MODE_480_Tall
    DW  o MODE_Single_Line, nil
```

```
MODE_360x200:         ; Data for 360 by 200 Pixels

      DB  067h       ; 400 scan Lines & 28 Mhz Clock
      DB  3          ; Maximum of 3 Pages
      DW  360, 200   ; Displayed Pixels (X,Y)
      DW  1302, 728  ; Max Possible X and Y Sizes

      DW  o MODE_360_Wide, MODE_200_Tall
      DW  o MODE_Double_Line, nil

MODE_360x400:         ; Data for 360 by 400 Pixels

      DB  067h       ; 400 scan Lines & 28 Mhz Clock
      DB  1          ; Maximum of 1 Pages
      DW  360, 400   ; Displayed Pixels X,Y
      DW  648, 816   ; Max Possible X and Y Sizes

      DW  o MODE_360_Wide, MODE_400_Tall
      DW  o MODE_Single_Line, nil


   ; ===== MODE X SETUP ROUTINES =====

;==================================================
;SET_VGA_MODEX% (ModeType%, MaxXPos%, MaxYpos%, Pages%)
;==================================================
;
; Sets Up the specified version of Mode X.  Allows for
; the setup of multiple video pages, and a virtual
; screen which can be larger than the displayed screen
; (which can then be scrolled a pixel at a time)
;
; ENTRY: ModeType = Desired Screen Resolution (0-7)
;
;    0 =  320 x 200, 4 Pages max,   1.2:1 Aspect Ratio
;    1 =  320 x 400, 2 Pages max,   2.4:1 Aspect Ratio
;    2 =  360 x 200, 3 Pages max,   1.35:1 Aspect Ratio
;    3 =  360 x 400, 1 Page  max,   2.7:1 Aspect Ratio
;    4 =  320 x 240, 3 Pages max,     1:1 Aspect Ratio
;    5 =  320 x 480, 1 Page  max,     2:1 Aspect Ratio
```

```
;    6 =  360 x 240, 3 Pages max, 1.125:1 Aspect Ratio
;    7 =  360 x 480, 1 Page  max,  2.25:1 Aspect Ratio
;
;       MaxXpos = The Desired Virtual Screen Width
;       MaxYpos = The Desired Virtual Screen Height
;       Pages   = The Desired # of Video Pages
;
; EXIT:  AX = Success Flag:   0 = Failure / -1= Success
;

SVM_STACK   STRUC
   SVM_Table   DW  ?   ; Offset of Mode Info Table
           DW  ?x4 ; DI, SI, DS, BP
           DD  ?   ; Caller
   SVM_Pages   DW  ?   ; # of Screen Pages desired
   SVM_Ysize   DW  ?   ; Vertical Screen Size Desired
   SVM_Xsize   DW  ?   ; Horizontal Screen Size Desired
   SVM_Mode    DW  ?   ; Display Resolution Desired
SVM_STACK   ENDS

   PUBLIC  SET_VGA_MODEX

SET_VGA_MODEX   PROC    FAR

   PUSHx   BP, DS, SI, DI      ; Preserve Important Registers
   SUB     SP, 2               ; Allocate workspace
   MOV     BP, SP              ; Set up Stack Frame

   ; Check Legality of Mode Request....

   MOV     BX, [BP].SVM_Mode   ; Get Requested Mode #
   CMP     BX, NUM_MODES       ; Is it 0..7?
   JAE     @SVM_BadModeSetup   ; If Not, Error out

   SHL     BX, 1               ; Scale BX
   MOV     SI, w MODE_TABLE[BX]   ; CS:SI -> Mode Info
   MOV     [BP].SVM_Table, SI     ; Save ptr for later use

   ; Check # of Requested Display Pages
```

```
MOV    CX, [BP].SVM_Pages  ; Get # of Requested Pages
CLR    CH                  ; Set Hi Word = 0!
CMP    CL, CS:[SI].M_Pages ; Check # Pages for mode
JA     @SVM_BadModeSetup   ; Report Error if too Many Pages
JCXZ   @SVM_BadModeSetup   ; Report Error if 0 Pages

; Check Validity of X Size

AND    [BP].SVM_XSize, 0FFF8h  ; X size Mod 8 Must = 0

MOV    AX, [BP].SVM_XSize  ; Get Logical Screen Width
CMP    AX, CS:[SI].M_XSize ; Check against Displayed X
JB     @SVM_BadModeSetup   ; Report Error if too small
CMP    AX, CS:[SI].M_XMax  ; Check against Max X
JA     @SVM_BadModeSetup   ; Report Error if too big

; Check Validity of Y Size

MOV    BX, [BP].SVM_YSize  ; Get Logical Screen Height
CMP    BX, CS:[SI].M_YSize ; Check against Displayed Y
JB     @SVM_BadModeSetup   ; Report Error if too small
CMP    BX, CS:[SI].M_YMax  ; Check against Max Y
JA     @SVM_BadModeSetup   ; Report Error if too big

; Enough memory to Fit it all?

SHR    AX, 2               ; # of Bytes:Line = XSize/4
MUL    CX                  ; AX = Bytes/Line * Pages
MUL    BX                  ; DX:AX = Total VGA mem needed
JNO    @SVM_Continue       ; Exit if Total Size > 256K

DEC    DX                  ; Was it Exactly 256K???
OR     DX, AX              ; (DX = 1, AX = 0000)
JZ     @SVM_Continue       ; if so, it's valid...

@SVM_BadModeSetup:

CLR    AX                  ; Return Value = False
JMP    @SVM_Exit           ; Normal Exit
```

```
@SVM_Continue:

    MOV    AX, 13H          ; Start with Mode 13H
    INT    10H              ; Let BIOS Set Mode

    OUT_16  SC_INDEX, CHAIN4_OFF          ; Disable Chain 4 Mode
    OUT_16  SC_INDEX, ASYNC_RESET         ; (A)synchronous Reset
    OUT_8   MISC_OUTPUT, CS:[SI].M_MiscR  ; Set New Timing/Size
    OUT_16  SC_INDEX, SEQU_RESTART        ; Restart Sequencer ...

    OUT_8   CRTC_INDEX, 11H    ; Select Vert Retrace End Register
    INC    DX               ; Point to Data
    IN     AL, DX           ; Get Value, Bit 7 = Protect
    AND    AL, 7FH          ; Mask out Write Protect
    OUT    DX, AL           ; And send it back

    MOV    DX, CRTC_INDEX   ; Vga Crtc Registers
    ADD    SI, M_CRTC       ; SI -> CRTC Parameter Data

    ; Load Tables of CRTC Parameters from List of Tables

@SVM_Setup_Table:

    MOV    DI, CS:[SI]      ; Get Pointer to CRTC Data Tbl
    ADD    SI, 2            ; Point to next Ptr Entry
    OR     DI, DI           ; A nil Ptr means that we have
    JZ     @SVM_Set_Data    ; finished CRTC programming

@SVM_Setup_CRTC:
    MOV    AX, CS:[DI]      ; Get CRTC Data from Table
    ADD    DI, 2            ; Advance Pointer
    OR     AX, AX           ; At End of Data Table?
    JZ     @SVM_Setup_Table ; If so, Exit & get next Table

    OUT    DX, AX           ; Reprogram VGA CRTC reg
    JMP    s @SVM_Setup_CRTC  ; Process Next Table Entry

    ; Initialize Page & Scroll info, DI = 0

@SVM_Set_Data:
```

```
MOV    DISPLAY_PAGE, DI    ; Display Page = 0
MOV    ACTIVE_PAGE, DI     ; Active Page = 0
MOV    CURRENT_PAGE, DI    ; Current Page (Offset) = 0
MOV    CURRENT_XOFFSET, DI ; Horz Scroll Index = 0
MOV    CURRENT_YOFFSET, DI ; Vert Scroll Index = 0
MOV    CURRENT_MOFFSET, DI ; Memory Scroll Index = 0

MOV    AX, VGA_SEGMENT     ; Segment for VGA memory
MOV    CURRENT_SEGMENT, AX ; Save for Future LES's

; Set Logical Screen Width, X Scroll and Our Data

MOV    SI, [BP].SVM_Table  ; Get Saved Ptr to Mode Info
MOV    AX, [BP].SVM_Xsize  ; Get Display Width

MOV    CX, AX              ; CX = Logical Width
SUB    CX, CS:[SI].M_XSize ; CX = Max X Scroll Value
MOV    MAX_XOFFSET, CX     ; Set Maximum X Scroll

SHR    AX, 2               ; Bytes = Pixels / 4
MOV    SCREEN_WIDTH, AX    ; Save Width in Pixels

SHR    AX, 1               ; Offset Value = Bytes / 2
MOV    AH, 13h             ; CRTC Offset Register Index
XCHG   AL, AH              ; Switch format for OUT
OUT    DX, AX              ; Set VGA CRTC Offset Reg

; Setup Data table, Y Scroll, Misc for Other Routines

MOV    AX, [BP].SVM_Ysize  ; Get Logical Screen Height

MOV    CX, AX              ; CX = Logical Height
SUB    BX, CS:[SI].M_YSize ; CX = Max Y Scroll Value
MOV    MAX_YOFFSET, CX     ; Set Maximum Y Scroll

MOV    SCREEN_HEIGHT, AX   ; Save Height in Pixels
MUL    SCREEN_WIDTH        ; AX = Page Size in Bytes,
MOV    PAGE_SIZE, AX       ; Save Page Size

MOV    CX, [BP].SVM_Pages  ; Get # of Pages
```

```
MOV    LAST_PAGE, CX      ; Save # of Pages

CLR    BX                 ; Page # = 0
MOV    DX, BX             ; Page 0 Offset = 0

@SVM_Set_Pages:

MOV    PAGE_ADDR[BX], DX  ; Set Page #(BX) Offset
ADD    BX, 2              ; Page#++
ADD    DX, AX             ; Compute Addr of Next Page
LOOPx  CX, @SVM_Set_Pages ; Loop until all Pages Set

; Clear VGA Memory

OUT_16 SC_INDEX, ALL_PLANES_ON ; Select All Planes
LES    DI, d CURRENT_PAGE      ; -> Start of VGA memory

CLR    AX                 ; AX = 0
CLD                       ; Block Xfer Forwards
MOV    CX, 8000H          ; 32K * 4 * 2 = 256K
REP    STOSW              ; Clear dat memory!

; Setup Font Pointers

MOV    BH, ROM_8x8_Lo     ; Ask for 8x8 Font, 0-127
MOV    AX, GET_CHAR_PTR   ; Service to Get Pointer
INT    10h                ; Call VGA BIOS

MOV    CHARSET_LOW, BP    ; Save Char Set Offset
MOV    CHARSET_LOW+2, ES  ; Save Char Set Segment

MOV    BH, ROM_8x8_Hi     ; Ask for 8x8 Font, 128-255
MOV    AX, GET_CHAR_PTR   ; Service to Get Pointer
INT    10h                ; Call VGA BIOS

MOV    CHARSET_HI, BP     ; Save Char Set Offset
MOV    CHARSET_HI+2, ES   ; Save Char Set Segment

MOV    AX, True           ; Return Success Code
```

```
@SVM_EXIT:
   ADD    SP, 2            ; Deallocate workspace
   POPx   DI, SI, DS, BP     ; Restore Saved Registers
   RET    8                ; Exit & Clean Up Stack

SET_VGA_MODEX  ENDP


;==================
;SET_MODEX% (Mode%)
;==================
;
; Quickie Mode Set - Sets Up Mode X to Default Configuration
;
; ENTRY: ModeType = Desired Screen Resolution (0-7)
;      (See SET_VGA_MODEX for list)
;
; EXIT:  AX = Success Flag:  0 = Failure / -1= Success
;

SM_STACK   STRUC
           DW  ?,? ; BP, SI
           DD  ?   ; Caller
   SM_Mode    DW  ?  ; Desired Screen Resolution
SM_STACK   ENDS

   PUBLIC  SET_MODEX

SET_MODEX  PROC   FAR

   PUSHx   BP, SI           ; Preserve Important registers
   MOV     BP, SP           ; Set up Stack Frame

   CLR     AX               ; Assume Failure
   MOV     BX, [BP].SM_Mode    ; Get Desired Mode #
   CMP     BX, NUM_MODES      ; Is it a Valid Mode #?
   JAE     @SMX_Exit          ; If Not, don't Bother

   PUSH    BX               ; Push Mode Parameter
```

```
  SHL    BX, 1              ; Scale BX to word Index
  MOV    SI, w MODE_TABLE[BX]   ; CS:SI -> Mode Info

  PUSH   CS:[SI].M_XSize    ; Push Default X Size
  PUSH   CS:[SI].M_Ysize    ; Push Default Y size
  MOV    AL, CS:[SI].M_Pages ; Get Default # of Pages
  CLR    AH                 ; Hi Byte = 0
  PUSH   AX                 ; Push # Pages

  CALL   f SET_VGA_MODEX    ; Set up Mode X!

@SMX_Exit:
  POPx   SI, BP             ; Restore Registers
  RET    2                  ; Exit & Clean Up Stack

SET_MODEX   ENDP


  ; ===== BASIC GRAPHICS PRIMITIVES =====

;==============================
;CLEAR_VGA_SCREEN (ColorNum%)
;==============================
;
; Clears the active display page
;
; ENTRY: ColorNum = Color Value to fill the page with
;
; EXIT:  No meaningful values returned
;

CVS_STACK   STRUC
          DW  ?,? ; DI, BP
          DD  ?   ; Caller
  CVS_COLOR   DB  ?,? ; Color to Set Screen to
CVS_STACK   ENDS

  PUBLIC  CLEAR_VGA_SCREEN

CLEAR_VGA_SCREEN   PROC   FAR
```

```
  PUSHx  BP, DI          ; Preserve Important Registers
  MOV    BP, SP          ; Set up Stack Frame

  OUT_16 SC_INDEX, ALL_PLANES_ON ; Select All Planes
  LES    DI, d CURRENT_PAGE     ; Point to Active VGA Page

  MOV    AL, [BP].CVS_COLOR  ; Get Color
  MOV    AH, AL          ; Copy for Word Write
  CLD                    ; Block fill Forwards

  MOV    CX, PAGE_SIZE      ; Get Size of Page
  SHR    CX, 1           ; Divide by 2 for Words
  REP    STOSW           ; Block Fill VGA memory

  POPx   DI, BP          ; Restore Saved Registers
  RET    2               ; Exit & Clean Up Stack

CLEAR_VGA_SCREEN   ENDP


;==================================================
;SET_POINT (Xpos%, Ypos%, ColorNum%)
;==================================================
;
; Plots a single Pixel on the active display page
;
; ENTRY: Xpos     = X position to plot pixel at
;        Ypos     = Y position to plot pixel at
;        ColorNum = Color to plot pixel with
;
; EXIT:  No meaningful values returned
;

SP_STACK   STRUC
           DW  ?,? ; BP, DI
           DD  ?   ; Caller
  SETP_Color  DB  ?,? ; Color of Point to Plot
  SETP_Ypos   DW  ?   ; Y pos of Point to Plot
  SETP_Xpos   DW  ?   ; X pos of Point to Plot
```

```
SP_STACK    ENDS

    PUBLIC SET_POINT

SET_POINT   PROC    FAR

  PUSHx   BP, DI           ; Preserve Registers
  MOV     BP, SP           ; Set up Stack Frame

  LES     DI, d CURRENT_PAGE  ; Point to Active VGA Page

  MOV     AX, [BP].SETP_Ypos  ; Get Line # of Pixel
  MUL     SCREEN_WIDTH        ; Get Offset to Start of Line

  MOV     BX, [BP].SETP_Xpos  ; Get Xpos
  MOV     CX, BX              ; Copy to extract Plane # from
  SHR     BX, 2               ; X offset (Bytes) = Xpos/4
  ADD     BX, AX              ; Offset = Width*Ypos + Xpos/4

  MOV     AX, MAP_MASK_PLANE1 ; Map Mask & Plane Select Register
  AND     CL, PLANE_BITS      ; Get Plane Bits
  SHL     AH, CL              ; Get Plane Select Value
  OUT_16  SC_Index, AX        ; Select Plane

  MOV     AL,[BP].SETP_Color  ; Get Pixel Color
  MOV     ES:[DI+BX], AL      ; Draw Pixel

  POPx    DI, BP              ; Restore Saved Registers
  RET     6                   ; Exit and Clean up Stack

SET_POINT      ENDP


;===========================
;READ_POINT% (Xpos%, Ypos%)
;===========================
;
; Read the color of a pixel from the Active Display Page
;
; ENTRY: Xpos = X position of pixel to read
```

```
;       Ypos = Y position of pixel to read
;
; EXIT:  AX   = Color of Pixel at (Xpos, Ypos)
;

RP_STACK    STRUC
        DW  ?,? ; BP, DI
        DD  ?   ; Caller
  RP_Ypos DW  ?   ; Y pos of Point to Read
  RP_Xpos DW  ?   ; X pos of Point to Read
RP_STACK    ENDS

     PUBLIC  READ_POINT

READ_POINT     PROC    FAR

  PUSHx   BP, DI            ; Preserve Registers
  MOV     BP, SP            ; Set up Stack Frame

  LES     DI, d CURRENT_PAGE  ; Point to Active VGA Page

  MOV     AX, [BP].RP_Ypos    ; Get Line # of Pixel
  MUL     SCREEN_WIDTH        ; Get Offset to Start of Line

  MOV     BX, [BP].RP_Xpos    ; Get Xpos
  MOV     CX, BX
  SHR     BX, 2             ; X offset (Bytes) = Xpos/4
  ADD     BX, AX            ; Offset = Width*Ypos + Xpos/4

  MOV     AL, READ_MAP        ; GC Read Mask Register
  MOV     AH, CL            ; Get Xpos
  AND     AH, PLANE_BITS      ; & mask out Plane #
  OUT_16  GC_INDEX, AX        ; Select Plane to read in

  CLR     AH                ; Clear Return Value Hi byte
  MOV     AL, ES:[DI+BX]      ; Get Color of Pixel

  POPx    DI, BP            ; Restore Saved Registers
  RET     4                 ; Exit and Clean up Stack
```

```
READ_POINT      ENDP


;===========================================================
;FILL_BLOCK (Xpos1%, Ypos1%, Xpos2%, Ypos2%, ColorNum%)
;===========================================================
;
; Fills a rectangular block on the active display Page
;
; ENTRY: Xpos1    = Left X position of area to fill
;        Ypos1    = Top Y position of area to fill
;        Xpos2    = Right X position of area to fill
;        Ypos2    = Bottom Y position of area to fill
;        ColorNum = Color to fill area with
;
; EXIT:  No meaningful values returned
;

FB_STACK    STRUC
            DW  ?x4 ; DS, DI, SI, BP
            DD  ?   ; Caller
  FB_Color    DB  ?,? ; Fill Color
  FB_Ypos2    DW  ?   ; Y pos of Lower Right Pixel
  FB_Xpos2    DW  ?   ; X pos of Lower Right Pixel
  FB_Ypos1    DW  ?   ; Y pos of Upper Left Pixel
  FB_Xpos1    DW  ?   ; X pos of Upper Left Pixel
FB_STACK    ENDS

    PUBLIC  FILL_BLOCK

FILL_BLOCK  PROC    FAR

  PUSHx   BP, DS, SI, DI     ; Preserve Important Registers
  MOV     BP, SP             ; Set up Stack Frame

  LES     DI, d CURRENT_PAGE  ; Point to Active VGA Page
  CLD                         ; Direction Flag = Forward

  OUT_8   SC_INDEX, MAP_MASK  ; Set up for Plane Select
```

```
; Validate Pixel Coordinates
; If necessary, Swap so X1 <= X2, Y1 <= Y2

MOV   AX, [BP].FB_Ypos1  ; AX = Y1   is Y1< Y2?
MOV   BX, [BP].FB_Ypos2  ; BX = Y2
CMP   AX, BX
JLE   @FB_NOSWAP1

MOV   [BP].FB_Ypos1, BX  ; Swap Y1 and Y2 and save Y1
XCHG  AX, BX             ; on stack for future use

@FB_NOSWAP1:
SUB   BX, AX             ; Get Y width
INC   BX                 ; Add 1 to avoid 0 value
MOV   [BP].FB_Ypos2, BX  ; Save in Ypos2

MUL   SCREEN_WIDTH       ; Mul Y1 by Bytes per Line
ADD   DI, AX             ; DI = Start of Line Y1

MOV   AX, [BP].FB_Xpos1  ; Check X1 <= X2
MOV   BX, [BP].FB_Xpos2  ;
CMP   AX, BX
JLE   @FB_NOSWAP2        ; Skip Ahead if Ok

MOV   [BP].FB_Xpos2, AX  ; Swap X1 AND X2 and save X2
XCHG  AX, BX             ; on stack for future use

; All our Input Values are in order, Now determine
; How many full "bands" 4 pixels wide (aligned) there
; are, and if there are partial bands (<4 pixels) on
; the left and right edges.

@FB_NOSWAP2:
MOV   DX, AX             ; DX = X1 (Pixel Position)
SHR   DX, 2              ; DX/4 = Bytes into Line
ADD   DI, DX             ; DI = Addr of Upper-Left Corner

MOV   CX, BX             ; CX = X2 (Pixel Position)
SHR   CX, 2              ; CX/4 = Bytes into Line
```

```
  CMP    DX, CX            ; Start and end in same band?
  JNE    @FB_NORMAL        ; if not, check for l & r edges
  JMP    @FB_ONE_BAND_ONLY ; if so, then special processing

@FB_NORMAL:
  SUB    CX, DX            ; CX = # bands -1
  MOV    SI, AX            ; SI = PLANE#(X1)
  AND    SI, PLANE_BITS    ; if Left edge is aligned then
  JZ     @FB_L_PLANE_FLUSH ; no special processing..

  ; Draw "Left Edge" vertical strip of 1-3 pixels...

  OUT_8  SC_Data, Left_Clip_Mask[SI] ; Set Left Edge Plane Mask

  MOV    SI, DI            ; SI = Copy of Start Addr (UL)

  MOV    DX, [BP].FB_Ypos2 ; Get # of Lines to draw
  MOV    AL, [BP].FB_Color ; Get Fill Color
  MOV    BX, SCREEN_WIDTH  ; Get Vertical increment Value

@FB_LEFT_LOOP:
  MOV    ES:[SI], AL       ; Fill in Left Edge Pixels
  ADD    SI, BX            ; Point to Next Line (Below)
  LOOPjz DX, @FB_LEFT_CONT ; Exit loop if all Lines Drawn

  MOV    ES:[SI], AL       ; Fill in Left Edge Pixels
  ADD    SI, BX            ; Point to Next Line (Below)
  LOOPx  DX, @FB_LEFT_LOOP ; loop until left strip is drawn

@FB_LEFT_CONT:

  INC    DI                ; Point to Middle (or Right) Block
  DEC    CX                ; Reset CX instead of JMP @FB_RIGHT

@FB_L_PLANE_FLUSH:
  INC    CX                ; Add in Left band to middle block

  ; DI = Addr of 1st middle Pixel (band) to fill
  ; CX = # of Bands to fill -1
```

```
@FB_RIGHT:
   MOV    SI, [BP].FB_Xpos2  ; Get Xpos2
   AND    SI, PLANE_BITS     ; Get Plane values
   CMP    SI, 0003           ; Plane = 3?
   JE     @FB_R_EDGE_FLUSH   ; Hey, add to middle

   ; Draw "Right Edge" vertical strip of 1-3 pixels...

   OUT_8  SC_Data, Right_Clip_Mask[SI]   ; Right Edge Plane Mask

   MOV    SI, DI             ; Get Addr of Left Edge
   ADD    SI, CX             ; Add Width-1 (Bands)
   DEC    SI                 ; To point to top of Right Edge

   MOV    DX, [BP].FB_Ypos2  ; Get # of Lines to draw
   MOV    AL, [BP].FB_Color  ; Get Fill Color
   MOV    BX, SCREEN_WIDTH   ; Get Vertical increment Value

@FB_RIGHT_LOOP:
   MOV    ES:[SI], AL        ; Fill in Right Edge Pixels
   ADD    SI, BX             ; Point to Next Line (Below)
   LOOPjz DX, @FB_RIGHT_CONT ; Exit loop if all Lines Drawn

   MOV    ES:[SI], AL        ; Fill in Right Edge Pixels
   ADD    SI, BX             ; Point to Next Line (Below)
   LOOPx  DX, @FB_RIGHT_LOOP ; loop until left strip is drawn

@FB_RIGHT_CONT:

   DEC    CX                 ; Minus 1 for Middle bands
   JZ     @FB_EXIT           ; Uh.. no Middle bands...

@FB_R_EDGE_FLUSH:

   ; DI = Addr of Upper Left block to fill
   ; CX = # of Bands to fill in (width)

   OUT_8  SC_Data, ALL_PLANES ; Write to All Planes

   MOV    DX, SCREEN_WIDTH   ; DX = DI Increment
```

```
SUB     DX, CX             ;  = Screen_Width-# Planes Filled

MOV     BX, CX             ; BX = Quick Refill for CX
MOV     SI, [BP].FB_Ypos2  ; SI = # of Line to Fill
MOV     AL, [BP].FB_Color  ; Get Fill Color

@FB_MIDDLE_LOOP:
REP     STOSB              ; Fill in entire line

MOV     CX, BX             ; Recharge CX (Line Width)
ADD     DI, DX             ; Point to start of Next Line
LOOPx   SI, @FB_MIDDLE_LOOP ; Loop until all lines drawn

JMP     s @FB_EXIT         ; Outa here

@FB_ONE_BAND_ONLY:
MOV     SI, AX             ; Get Left Clip Mask, Save X1
AND     SI, PLANE_BITS     ; Mask out Row #
MOV     AL, Left_Clip_Mask[SI]  ; Get Left Edge Mask
MOV     SI, BX             ; Get Right Clip Mask, Save X2
AND     SI, PLANE_BITS     ; Mask out Row #
AND     AL, Right_Clip_Mask[SI] ; Get Right Edge Mask byte

OUT_8   SC_Data, AL        ; Clip For Left & Right Masks

MOV     CX, [BP].FB_Ypos2  ; Get # of Lines to draw
MOV     AL, [BP].FB_Color  ; Get Fill Color
MOV     BX, SCREEN_WIDTH   ; Get Vertical increment Value

@FB_ONE_LOOP:
MOV     ES:[DI], AL        ; Fill in Pixels
ADD     DI, BX             ; Point to Next Line (Below)
LOOPjz  CX, @FB_EXIT       ; Exit loop if all Lines Drawn

MOV     ES:[DI], AL        ; Fill in Pixels
ADD     DI, BX             ; Point to Next Line (Below)
LOOPx   CX, @FB_ONE_LOOP   ; loop until left strip is drawn

@FB_EXIT:
POPx    DI, SI, DS, BP     ; Restore Saved Registers
```

```
  RET     10              ; Exit and Clean up Stack

FILL_BLOCK   ENDP


;==================================================================
;DRAW_LINE (Xpos1%, Ypos1%, Xpos2%, Ypos2%, ColorNum%)
;==================================================================
;
; Draws a Line on the active display page
;
; ENTRY: Xpos1    = X position of first point on line
;        Ypos1    = Y position of first point on line
;        Xpos2    = X position of last point on line
;        Ypos2    = Y position of last point on line
;        ColorNum = Color to draw line with
;
; EXIT:  No meaningful values returned
;

DL_STACK    STRUC
            DW  ?x3 ; DI, SI, BP
            DD  ?   ; Caller
  DL_ColorF  DB  ?,? ; Line Draw Color
  DL_Ypos2   DW  ?   ; Y pos of last point
  DL_Xpos2   DW  ?   ; X pos of last point
  DL_Ypos1   DW  ?   ; Y pos of first point
  DL_Xpos1   DW  ?   ; X pos of first point
DL_STACK    ENDS

    PUBLIC DRAW_LINE

DRAW_LINE   PROC   FAR

  PUSHx  BP, SI, DI         ; Preserve Important Registers
  MOV    BP, SP             ; Set up Stack Frame
  CLD                       ; Direction Flag = Forward

  OUT_8  SC_INDEX, MAP_MASK  ; Set up for Plane Select
  MOV    CH, [BP].DL_ColorF  ; Save Line Color in CH
```

```
; Check Line Type

MOV    SI, [BP].DL_Xpos1   ; AX = X1   is X1< X2?
MOV    DI, [BP].DL_Xpos2   ; DX = X2
CMP    SI, DI              ; Is X1 < X2
JE     @DL_VLINE           ; If X1=X2, Draw Vertical Line
JL     @DL_NOSWAP1         ; If X1 < X2, don't swap

XCHG   SI, DI              ; X2 IS > X1, SO SWAP THEM

@DL_NOSWAP1:

; SI = X1, DI = X2

MOV    AX, [BP].DL_Ypos1   ; AX = Y1   is Y1 <> Y2?
CMP    AX, [BP].DL_Ypos2   ; Y1 = Y2?
JE     @DL_HORZ            ; If so, Draw a Horizontal Line

JMP    @DL_BREZHAM         ; Diagonal line... go do it...

; This Code draws a Horizontal Line in Mode X where:
; SI = X1, DI = X2, and AX = Y1/Y2

@DL_HORZ:

MUL    SCREEN_WIDTH        ; Offset = Ypos * Screen_Width
MOV    DX, AX              ; CX = Line offset into Page

MOV    AX, SI              ; Get Left edge, Save X1
AND    SI, PLANE_BITS      ; Mask out Row #
MOV    BL, Left_Clip_Mask[SI]  ; Get Left Edge Mask
MOV    CX, DI              ; Get Right edge, Save X2
AND    DI, PLANE_BITS      ; Mask out Row #
MOV    BH, Right_Clip_Mask[DI] ; Get Right Edge Mask byte

SHR    AX, 2               ; Get X1 Byte # (=X1/4)
SHR    CX, 2               ; Get X2 Byte # (=X2/4)

LES    DI, d CURRENT_PAGE  ; Point to Active VGA Page
```

```
    ADD     DI, DX          ; Point to Start of Line
    ADD     DI, AX          ; Point to Pixel X1

    SUB     CX, AX          ; CX = # Of Bands (-1) to set
    JNZ     @DL_LONGLN          ; jump if longer than one segment

    AND     BL, BH          ; otherwise, merge clip masks

@DL_LONGLN:

    OUT_8   SC_Data, BL         ; Set the Left Clip Mask

    MOV     AL, [BP].DL_ColorF  ; Get Line Color
    MOV     BL, AL              ; BL = Copy of Line Color
    STOSB                   ; Set Left (1-4) Pixels

    JCXZ    @DL_EXIT            ; Done if only one Line Segment

    DEC     CX              ; CX = # of Middle Segments
    JZ      @DL_XRSEG           ; If no middle segments....

    ; Draw Middle Segments

    OUT_8   DX, ALL_PLANES      ; Write to ALL Planes

    MOV     AL, BL              ; Get Color from BL
    REP     STOSB           ; Draw Middle (4 Pixel) Segments

@DL_XRSEG:
    OUT_8   DX, BH              ; Select Planes for Right Clip Mask
    MOV     AL, BL              ; Get Color Value
    STOSB                   ; Draw Right (1-4) Pixels

    JMP     s @DL_EXIT          ; We Are Done...


    ; This Code Draws A Vertical Line.  On entry:
    ; CH = Line Color, SI & DI = X1

@DL_VLINE:
```

```
    MOV    AX, [BP].DL_Ypos1  ; AX = Y1
    MOV    SI, [BP].DL_Ypos2  ; SI = Y2
    CMP    AX, SI             ; Is Y1 < Y2?
    JLE    @DL_NOSWAP2        ; if so, Don't Swap them

    XCHG   AX, SI             ; Ok, NOW Y1 < Y2

@DL_NOSWAP2:

    SUB    SI, AX             ; SI = Line Height (Y2-Y1+1)
    INC    SI

    ; AX = Y1, DI = X1, Get offset into Page into AX

    MUL    SCREEN_WIDTH       ; Offset = Y1 (AX) * Screen Width
    MOV    DX, DI             ; Copy Xpos into DX
    SHR    DI, 2              ; DI = Xpos/4
    ADD    AX, DI             ; DI = Xpos/4 + ScreenWidth * Y1

    LES    DI, d CURRENT_PAGE ; Point to Active VGA Page
    ADD    DI, AX             ; Point to Pixel X1, Y1

    ;Select Plane

    MOV    CL, DL             ; CL = Save X1
    AND    CL, PLANE_BITS     ; Get X1 MOD 4 (Plane #)
    MOV    AX, MAP_MASK_PLANE1 ; Code to set Plane #1
    SHL    AH, CL             ; Change to Correct Plane #
    OUT_16 SC_Index, AX       ; Select Plane

    MOV    AL, CH             ; Get Saved Color
    MOV    BX, SCREEN_WIDTH   ; Get Offset to Advance Line By

@DL_VLoop:
    MOV    ES:[DI], AL        ; Draw Single Pixel
    ADD    DI, BX             ; Point to Next Line
    LOOPjz SI, @DL_EXIT       ; Lines--, Exit if done

    MOV    ES:[DI], AL        ; Draw Single Pixel
```

```
   ADD    DI, BX            ; Point to Next Line
   LOOPx  SI, @DL_VLoop     ; Lines--, Loop until Done

@DL_EXIT:

   JMP    @DL_EXIT2         ; Done!

   ; This code Draws a diagonal line in Mode X

@DL_BREZHAM:
   LES    DI, d CURRENT_PAGE  ; Point to Active VGA Page

   MOV    AX, [BP].DL_Ypos1   ; get Y1 value
   MOV    BX, [BP].DL_Ypos2   ; get Y2 value
   MOV    CX, [BP].DL_Xpos1   ; Get Starting Xpos

   CMP    BX, AX            ; Y2-Y1 is?
   JNC    @DL_DeltaYOK      ; if Y2>=Y1 then goto...

   XCHG   BX, AX            ; Swap em...
   MOV    CX, [BP].DL_Xpos2   ; Get New Starting Xpos

@DL_DeltaYOK:
   MUL    SCREEN_WIDTH      ; Offset = SCREEN_WIDTH * Y1

   ADD    DI, AX            ; DI -> Start of Line Y1 on Page
   MOV    AX, CX            ; AX = Xpos (X1)
   SHR    AX, 2             ; /4 = Byte Offset into Line
   ADD    DI, AX            ; DI = Starting pos (X1,Y1)

   MOV    AL, 11h           ; Staring Mask
   AND    CL, PLANE_BITS    ; Get Plane #
   SHL    AL, CL            ; and shift into place
   MOV    AH, [BP].DL_ColorF  ; Color in Hi Bytes

   PUSH   AX                ; Save Mask,Color...

   MOV    AH, AL            ; Plane # in AH
   MOV    AL, MAP_MASK      ; Select Plane Register
   OUT_16 SC_Index, AX      ; Select initial plane
```

```
    MOV   AX, [BP].DL_Xpos1  ; get X1 value
    MOV   BX, [BP].DL_Ypos1  ; get Y1 value
    MOV   CX, [BP].DL_Xpos2  ; get X2 value
    MOV   DX, [BP].DL_Ypos2  ; get Y2 value

    MOV   BP, SCREEN_WIDTH   ; Use BP for Line width to
                             ; to avoid extra memory access

    SUB   DX, BX             ; figure Delta_Y
    JNC   @DL_DeltaYOK2      ; jump if Y2 >= Y1

    ADD   BX, DX             ; put Y2 into Y1
    NEG   DX                 ; abs(Delta_Y)
    XCHG  AX, CX             ; and exchange X1 and X2

@DL_DeltaYOK2:
    MOV   BX, 08000H         ; seed for fraction accumulator

    SUB   CX, AX             ; figure Delta_X
    JC    @DL_DrawLeft       ; if negative, go left

    JMP   @DL_DrawRight      ; Draw Line that slopes right

@DL_DrawLeft:

    NEG   CX                 ; abs(Delta_X)

    CMP   CX, DX             ; is Delta_X < Delta_Y?
    JB    @DL_SteepLeft      ; yes, so go do steep line
                             ; (Delta_Y iterations)

    ; Draw a Shallow line to the left in Mode X

@DL_ShallowLeft:
    CLR   AX                 ; zero low word of Delta_Y * 10000h
    SUB   AX, DX             ; DX:AX <- DX * 0FFFFh
    SBB   DX, 0              ; include carry
    DIV   CX                 ; divide by Delta_X
```

```
MOV     SI, BX          ; SI = Accumulator
MOV     BX, AX          ; BX = Add fraction
POP     AX              ; Get Color, Bit mask
MOV     DX, SC_Data     ; Sequence controller data register
INC     CX              ; Inc Delta_X so we can unroll loop

; Loop (x2) to Draw Pixels, Move Left, and Maybe Down...

@DL_SLLLoop:
MOV     ES:[DI], AH     ; set first pixel, plane data set up
LOOPjz  CX, @DL_SLLExit ; Delta_X--, Exit if done

ADD     SI, BX          ; add numerator to accumulator
JNC     @DL_SLLL2nc     ; move down on carry

ADD     DI, BP          ; Move Down one line...

@DL_SLLL2nc:
DEC     DI              ; Left one addr
ROR     AL, 1           ; Move Left one plane, back on 0 1 2
CMP     AL, 87h         ; wrap?, if AL <88 then Carry set
ADC     DI, 0           ; Adjust Address: DI = DI + Carry
OUT     DX, AL          ; Set up New Bit Plane mask

MOV     ES:[DI], AH     ; set pixel
LOOPjz  CX, @DL_SLLExit ; Delta_X--, Exit if done

ADD     SI, BX          ; add numerator to accumulator,
JNC     @DL_SLLL3nc     ; move down on carry

ADD     DI, BP          ; Move Down one line...

@DL_SLLL3nc:            ; Now move left a pixel...
DEC     DI              ; Left one addr
ROR     AL, 1           ; Move Left one plane, back on 0 1 2
CMP     AL, 87h         ; Wrap?, if AL <88 then Carry set
ADC     DI, 0           ; Adjust Address: DI = DI + Carry
OUT     DX, AL          ; Set up New Bit Plane mask
JMP     s @DL_SLLLoop   ; loop until done
```

```
@DL_SLLExit:
  JMP    @DL_EXIT2         ; and exit

  ; Draw a steep line to the left in Mode X

@DL_SteepLeft:
  CLR    AX                ; zero low word of Delta_Y * 10000h
  XCHG   DX, CX            ; Delta_Y switched with Delta_X
  DIV    CX                ; divide by Delta_Y

  MOV    SI, BX            ; SI = Accumulator
  MOV    BX, AX            ; BX = Add Fraction
  POP    AX                ; Get Color, Bit mask
  MOV    DX, SC_Data       ; Sequence controller data register
  INC    CX                ; Inc Delta_Y so we can unroll loop

  ; Loop (x2) to Draw Pixels, Move Down, and Maybe left

@DL_STLLoop:

  MOV    ES:[DI], AH       ; set first pixel
  LOOPjz CX, @DL_STLExit   ; Delta_Y--, Exit if done

  ADD    SI, BX            ; add numerator to accumulator
  JNC    @DL_STLnc2        ; No carry, just move down!

  DEC    DI                ; Move Left one addr
  ROR    AL, 1             ; Move Left one plane, back on 0 1 2
  CMP    AL, 87h           ; Wrap?, if AL <88 then Carry set
  ADC    DI, 0             ; Adjust Address: DI = DI + Carry
  OUT    DX, AL            ; Set up New Bit Plane mask

@DL_STLnc2:
  ADD    DI, BP            ; advance to next line.

  MOV    ES:[DI], AH       ; set pixel
  LOOPjz CX, @DL_STLExit   ; Delta_Y--, Exit if done

  ADD    SI, BX            ; add numerator to accumulator
  JNC    @DL_STLnc3        ; No carry, just move down!
```

```
        DEC    DI              ; Move Left one addr
        ROR    AL, 1           ; Move Left one plane, back on 0 1 2
        CMP    AL, 87h         ; Wrap?, if AL <88 then Carry set
        ADC    DI, 0           ; Adjust Address: DI = DI + Carry
        OUT    DX, AL          ; Set up New Bit Plane mask

@DL_STLnc3:
        ADD    DI, BP          ; advance to next line.
        JMP    s @DL_STLLoop   ; Loop until done

@DL_STLExit:
        JMP    @DL_EXIT2       ; and exit

        ; Draw a line that goes to the Right...

@DL_DrawRight:
        CMP    CX, DX              ; is Delta_X < Delta_Y?
        JB     @DL_SteepRight      ; yes, so go do steep line
                                   ; (Delta_Y iterations)

        ; Draw a Shallow line to the Right in Mode X

@DL_ShallowRight:
        CLR    AX              ; zero low word of Delta_Y * 10000h
        SUB    AX, DX          ; DX:AX <- DX * 0FFFFh
        SBB    DX, 0           ; include carry
        DIV    CX              ; divide by Delta_X

        MOV    SI, BX          ; SI = Accumulator
        MOV    BX, AX          ; BX = Add Fraction
        POP    AX              ; Get Color, Bit mask
        MOV    DX, SC_Data     ; Sequence controller data register
        INC    CX              ; Inc Delta_X so we can unroll loop

        ; Loop (x2) to Draw Pixels, Move Right, and Maybe Down...

@DL_SLRLoop:
        MOV    ES:[DI], AH          ; set first pixel, mask is set up
        LOOPjz CX, @DL_SLRExit      ; Delta_X--, Exit if done..
```

```
  ADD    SI, BX          ; add numerator to accumulator
  JNC   @DL_SLR2nc          ; don't move down if carry not set

  ADD    DI, BP          ; Move Down one line...

@DL_SLR2nc:                 ; Now move right a pixel...
  ROL    AL, 1          ; Move Right one addr if Plane = 0
  CMP    AL, 12h          ; Wrap? if AL >12 then Carry not set
  ADC    DI, 0          ; Adjust Address: DI = DI + Carry
  OUT    DX, AL          ; Set up New Bit Plane mask

  MOV    ES:[DI], AH        ; set pixel
  LOOPjz  CX, @DL_SLRExit    ; Delta_X--, Exit if done..

  ADD    SI, BX          ; add numerator to accumulator
  JNC   @DL_SLR3nc          ; don't move down if carry not set

  ADD    DI, BP          ; Move Down one line...

@DL_SLR3nc:
  ROL    AL, 1          ; Move Right one addr if Plane = 0
  CMP    AL, 12h          ; Wrap? if AL >12 then Carry not set
  ADC    DI, 0          ; Adjust Address: DI = DI + Carry
  OUT    DX, AL          ; Set up New Bit Plane mask
  JMP   s @DL_SLRLoop       ; loop till done

@DL_SLRExit:
  JMP   @DL_EXIT2          ; and exit

  ; Draw a Steep line to the Right in Mode X

@DL_SteepRight:
  CLR    AX             ; zero low word of Delta_Y * 10000h
  XCHG   DX, CX          ; Delta_Y switched with Delta_X
  DIV    CX             ; divide by Delta_Y

  MOV    SI, BX          ; SI = Accumulator
  MOV    BX, AX          ; BX = Add Fraction
  POP    AX             ; Get Color, Bit mask
```

```
    MOV    DX, SC_Data        ; Sequence controller data register
    INC    CX                 ; Inc Delta_Y so we can unroll loop

    ; Loop (x2) to Draw Pixels, Move Down, and Maybe Right

  @STRLoop:
    MOV    ES:[DI], AH        ; set first pixel, mask is set up
    LOOPjz CX, @DL_EXIT2      ; Delta_Y--, Exit if Done

    ADD    SI, BX             ; add numerator to accumulator
    JNC    @STRnc2            ; if no carry then just go down...

    ROL    AL, 1              ; Move Right one addr if Plane = 0
    CMP    AL, 12h            ; Wrap? if AL >12 then Carry not set
    ADC    DI, 0              ; Adjust Address: DI = DI + Carry
    OUT    DX, AL             ; Set up New Bit Plane mask

  @STRnc2:
    ADD    DI, BP             ; advance to next line.

    MOV    ES:[DI], AH        ; set pixel
    LOOPjz CX, @DL_EXIT2      ; Delta_Y--, Exit if Done

    ADD    SI, BX             ; add numerator to accumulator
    JNC    @STRnc3            ; if no carry then just go down...

    ROL    AL, 1              ; Move Right one addr if Plane = 0
    CMP    AL, 12h            ; Wrap? if AL >12 then Carry not set
    ADC    DI, 0              ; Adjust Address: DI = DI + Carry
    OUT    DX, AL             ; Set up New Bit Plane mask

  @STRnc3:
    ADD    DI, BP             ; advance to next line.
    JMP    s @STRLoop         ; loop till done

  @DL_EXIT2:
    POPx   DI, SI, BP         ; Restore Saved Registers
    RET    10                 ; Exit and Clean up Stack

DRAW_LINE    ENDP
```

; ===== DAC COLOR REGISTER ROUTINES =====

```
;=================================================
;SET_DAC_REGISTER (Register%, Red%, Green%, Blue%)
;=================================================
;
; Sets a single (RGB) Vga Palette Register
;
; ENTRY: Register = The DAC # to modify (0-255)
;      Red      = The new Red Intensity (0-63)
;      Green    = The new Green Intensity (0-63)
;      Blue     = The new Blue Intensity (0-63)
;
; EXIT:  No meaningful values returned
;

SDR_STACK   STRUC
            DW  ?   ; BP
            DD  ?   ; Caller
  SDR_Blue      DB  ?,? ; Blue Data Value
  SDR_Green     DB  ?,? ; Green Data Value
  SDR_Red       DB  ?,? ; Red Data Value
  SDR_Register  DB  ?,? ; Palette Register #
SDR_STACK   ENDS

  PUBLIC  SET_DAC_REGISTER

SET_DAC_REGISTER   PROC   FAR

  PUSH   BP              ; Save BP
  MOV    BP, SP          ; Set up Stack Frame

  ; Select which DAC Register to modify

  OUT_8  DAC_WRITE_ADDR, [BP].SDR_Register

  MOV    DX, PEL_DATA_REG   ; Dac Data Register
  OUT_8  DX, [BP].SDR_Red   ; Set Red Intensity
```

```
  OUT_8  DX, [BP].SDR_Green  ; Set Green Intensity
  OUT_8  DX, [BP].SDR_Blue   ; Set Blue Intensity

  POP    BP                ; Restore Registers
  RET    8                 ; Exit & Clean Up Stack

SET_DAC_REGISTER   ENDP

;==============================================================
;GET_DAC_REGISTER (Register%, &Red%, &Green%, &Blue%)
;==============================================================
;
; Reads the RGB Values of a single Vga Palette Register
;
; ENTRY: Register = The DAC # to read (0-255)
;        Red      = Offset to Red Variable in DS
;        Green    = Offset to Green Variable in DS
;        Blue     = Offset to Blue Variable in DS
;
; EXIT:  The values of the integer variables Red,
;        Green, and Blue are set to the values
;        taken from the specified DAC register.
;

GDR_STACK  STRUC
              DW ?  ; BP
              DD ?  ; Caller
  GDR_Blue      DW ?  ; Addr of Blue Data Value in DS
  GDR_Green     DW ?  ; Addr of Green Data Value in DS
  GDR_Red       DW ?  ; Addr of Red Data Value in DS
  GDR_Register  DB ?,? ; Palette Register #
GDR_STACK  ENDS

  PUBLIC GET_DAC_REGISTER

GET_DAC_REGISTER   PROC   FAR

  PUSH   BP            ; Save BP
  MOV    BP, SP        ; Set up Stack Frame
```

```
; Select which DAC Register to read in

OUT_8   DAC_READ_ADDR, [BP].GDR_Register

MOV     DX, PEL_DATA_REG   ; Dac Data Register
CLR     AX                 ; Clear AX

IN      AL, DX             ; Read Red Value
MOV     BX, [BP].GDR_Red   ; Get Address of Red%
MOV     [BX], AX           ; *Red% = AX

IN      AL, DX             ; Read Green Value
MOV     BX, [BP].GDR_Green ; Get Address of Green%
MOV     [BX], AX           ; *Green% = AX

IN      AL, DX             ; Read Blue Value
MOV     BX, [BP].GDR_Blue  ; Get Address of Blue%
MOV     [BX], AX           ; *Blue% = AX

POP     BP                 ; Restore Registers
RET     8                  ; Exit & Clean Up Stack

GET_DAC_REGISTER   ENDP


;=============================================================
=
;LOAD_DAC_REGISTERS (SEG PalData, StartReg%, EndReg%, Sync%)
;=============================================================
=
;
; Sets a Block of Vga Palette Registers
;
; ENTRY: PalData  = Far Pointer to Block of palette data
;        StartReg = First Register # in range to set (0-255)
;        EndReg   = Last Register # in Range to set (0-255)
;        Sync     = Wait for Vertical Retrace Flag (Boolean)
;
; EXIT:  No meaningful values returned
;
```

```
; NOTES: PalData is a linear array of 3 byte Palette values
;       in the order: Red  (0-63), Green (0-63), Blue (0-63)
;

LDR_STACK   STRUC
            DW  ?x3 ; BP, DS, SI
            DD  ?   ; Caller
  LDR_Sync      DW  ?   ; Vertical Sync Flag
  LDR_EndReg    DB  ?,? ; Last Register #
  LDR_StartReg  DB  ?,? ; First Register #
  LDR_PalData   DD  ?   ; Far Ptr to Palette Data
LDR_STACK   ENDS

  PUBLIC  LOAD_DAC_REGISTERS

LOAD_DAC_REGISTERS  PROC   FAR

  PUSHx  BP, DS, SI         ; Save Registers
  mov    BP, SP             ; Set up Stack Frame

  mov    AX, [BP].LDR_Sync  ; Get Vertical Sync Flag
  or     AX, AX             ; is Sync Flag = 0?
  jz     @LDR_Load          ; if so, skip call

  call   f SYNC_DISPLAY     ; wait for vsync

  ; Determine register #'s, size to copy, etc

@LDR_Load:

  lds    SI, [BP].LDR_PalData    ; DS:SI -> Palette Data
  mov    DX, DAC_WRITE_ADDR      ; DAC register # selector

  CLR    AX, BX                  ; Clear for byte loads
  mov    AL, [BP].LDR_StartReg   ; Get Start Register
  mov    BL, [BP].LDR_EndReg     ; Get End Register

  sub    BX, AX             ; BX = # of DAC registers -1
  inc    BX                 ; BX = # of DAC registers
  mov    CX, BX             ; CX = # of DAC registers
```

```
   add    CX, BX          ; CX = "  " * 2
   add    CX, BX          ; CX = "  " * 3
   cld                    ; Block OUTs forward
   out    DX, AL          ; set up correct register #

   ; Load a block of DAC Registers

   mov    DX, PEL_DATA_REG   ; Dac Data Register

   rep    outsb           ; block set DAC registers

   POPx   SI, DS, BP      ; Restore Registers
   ret    10              ; Exit & Clean Up Stack

LOAD_DAC_REGISTERS  ENDP


;==================================================
;READ_DAC_REGISTERS (SEG PalData, StartReg%, EndReg%)
;==================================================
;
; Reads a Block of Vga Palette Registers
;
; ENTRY: PalData  = Far Pointer to block to store palette data
;        StartReg = First Register # in range to read (0-255)
;        EndReg   = Last Register # in Range to read (0-255)
;
; EXIT:  No meaningful values returned
;
; NOTES: PalData is a linear array of 3 byte Palette values
;        in the order: Red  (0-63), Green (0-63), Blue (0-63)
;

RDR_STACK   STRUC
            DW  ?x3 ; BP, ES, DI
            DD  ?   ; Caller
  RDR_EndReg     DB  ?,? ; Last Register #
  RDR_StartReg   DB  ?,? ; First Register #
  RDR_PalData    DD  ?   ; Far Ptr to Palette Data
RDR_STACK   ENDS
```

```
  PUBLIC  READ_DAC_REGISTERS

READ_DAC_REGISTERS  PROC    FAR

  PUSHx   BP, ES, DI        ; Save Registers
  mov     BP, SP            ; Set up Stack Frame

  ; Determine register #'s, size to copy, etc

  les     DI, [BP].RDR_PalData    ; ES:DI -> Palette Buffer
  mov     DX, DAC_READ_ADDR       ; DAC register # selector

  CLR     AX, BX                  ; Clear for byte loads
  mov     AL, [BP].RDR_StartReg   ; Get Start Register
  mov     BL, [BP].RDR_EndReg     ; Get End Register

  sub     BX, AX            ; BX = # of DAC registers -1
  inc     BX                ; BX = # of DAC registers
  mov     CX, BX            ; CX = # of DAC registers
  add     CX, BX            ; CX =  "   " * 2
  add     CX, BX            ; CX =  "   " * 3
  cld                       ; Block INs forward

  ; Read a block of DAC Registers

  out     DX, AL            ; set up correct register #
  mov     DX, PEL_DATA_REG  ; Dac Data Register

  rep     insb              ; block read DAC registers

  POPx    DI, ES, BP        ; Restore Registers
  ret     8                 ; Exit & Clean Up Stack

READ_DAC_REGISTERS  ENDP


  ; ===== PAGE FLIPPING AND SCROLLING ROUTINES =====

;=========================
```

```
;SET_ACTIVE_PAGE (PageNo%)
;=========================
;
; Sets the active display Page to be used for future drawing
;
; ENTRY: PageNo = Display Page to make active
;       (values: 0 to Number of Pages - 1)
;
; EXIT:  No meaningful values returned
;

SAP_STACK  STRUC
           DW  ?  ; BP
           DD  ?  ; Caller
  SAP_Page   DW  ?  ; Page # for Drawing
SAP_STACK  ENDS

  PUBLIC  SET_ACTIVE_PAGE

SET_ACTIVE_PAGE PROC    FAR

  PUSH   BP              ; Preserve Registers
  MOV    BP, SP          ; Set up Stack Frame

  MOV    BX, [BP].SAP_Page   ; Get Desired Page #
  CMP    BX, LAST_PAGE       ; Is Page # Valid?
  JAE    @SAP_Exit           ; IF Not, Do Nothing

  MOV    ACTIVE_PAGE, BX     ; Set Active Page #

  SHL    BX, 1               ; Scale Page # to Word
  MOV    AX, PAGE_ADDR[BX]   ; Get offset to Page

  MOV    CURRENT_PAGE, AX    ; And set for future LES's

@SAP_Exit:
  POP    BP              ; Restore Registers
  RET    2               ; Exit and Clean up Stack

SET_ACTIVE_PAGE ENDP
```

```
;================
;GET_ACTIVE_PAGE%
;================
;
; Returns the Video Page # currently used for Drawing
;
; ENTRY: No Parameters are passed
;
; EXIT:  AX = Current Video Page used for Drawing
;

  PUBLIC  GET_ACTIVE_PAGE

GET_ACTIVE_PAGE PROC    FAR

  MOV     AX, ACTIVE_PAGE     ; Get Active Page #
  RET                         ; Exit and Clean up Stack

GET_ACTIVE_PAGE ENDP


;================================
;SET_DISPLAY_PAGE (DisplayPage%)
;================================
;
; Sets the currently visible display page.
; When called this routine syncronizes the display
; to the vertical blank.
;
; ENTRY: PageNo = Display Page to show on the screen
;        (values: 0 to Number of Pages - 1)
;
; EXIT:  No meaningful values returned
;

SDP_STACK   STRUC
            DW  ?      ; BP
            DD  ?      ; Caller
```

```
  SDP_Page   DW  ?       ; Page # to Display...
SDP_STACK   ENDS

  PUBLIC  SET_DISPLAY_PAGE

SET_DISPLAY_PAGE   PROC   FAR

  PUSH    BP              ; Preserve Registers
  MOV     BP, SP          ; Set up Stack Frame

  MOV     BX, [BP].SDP_Page  ; Get Desired Page #
  CMP     BX, LAST_PAGE      ; Is Page # Valid?
  JAE     @SDP_Exit          ; IF Not, Do Nothing

  MOV     DISPLAY_PAGE, BX   ; Set Display Page #

  SHL     BX, 1              ; Scale Page # to Word
  MOV     CX, PAGE_ADDR[BX]  ; Get offset in memory to Page
  ADD     CX, CURRENT_MOFFSET ; Adjust for any scrolling

  ; Wait if we are currently in a Vertical Retrace

  MOV     DX, INPUT_1        ; Input Status #1 Register

@DP_WAIT0:
  IN      AL, DX             ; Get VGA status
  AND     AL, VERT_RETRACE   ; In Display mode yet?
  JNZ     @DP_WAIT0          ; If Not, wait for it

  ; Set the Start Display Address to the new page

  MOV     DX, CRTC_Index     ; We Change the VGA Sequencer

  MOV     AL, START_DISP_LO  ; Display Start Low Register
  MOV     AH, CL             ; Low 8 Bits of Start Addr
  OUT     DX, AX             ; Set Display Addr Low

  MOV     AL, START_DISP_HI  ; Display Start High Register
  MOV     AH, CH             ; High 8 Bits of Start Addr
  OUT     DX, AX             ; Set Display Addr High
```

```
    ; Wait for a Vertical Retrace to smooth out things

    MOV     DX, INPUT_1         ; Input Status #1 Register

@DP_WAIT1:
    IN      AL, DX              ; Get VGA status
    AND     AL, VERT_RETRACE    ; Vertical Retrace Start?
    JZ      @DP_WAIT1           ; If Not, wait for it

    ; Now Set Display Starting Address


@SDP_Exit:
    POP     BP                  ; Restore Registers
    RET     2                   ; Exit and Clean up Stack

SET_DISPLAY_PAGE    ENDP


;=================
;GET_DISPLAY_PAGE%
;=================
;
; Returns the Video Page # currently displayed
;
; ENTRY: No Parameters are passed
;
; EXIT:  AX = Current Video Page being displayed
;

    PUBLIC  GET_DISPLAY_PAGE

GET_DISPLAY_PAGE    PROC    FAR

    MOV     AX, DISPLAY_PAGE    ; Get Display Page #
    RET                         ; Exit & Clean Up Stack

GET_DISPLAY_PAGE    ENDP
```

```
;==========================================
;SET_WINDOW (DisplayPage%, Xpos%, Ypos%)
;==========================================
;
; Since a Logical Screen can be larger than the Physical
; Screen, Scrolling is possible. This routine sets the
; Upper Left Corner of the Screen to the specified Pixel.
; Also Sets the Display page to simplify combined page
; flipping and scrolling. When called this routine
; syncronizes the display to the vertical blank.
;
; ENTRY: DisplayPage = Display Page to show on the screen
;       Xpos       = # of pixels to shift screen right
;       Ypos       = # of lines to shift screen down
;
; EXIT:  No meaningful values returned
;

SW_STACK   STRUC
           DW  ?  ; BP
           DD  ?  ; Caller
  SW_Ypos    DW  ?  ; Y pos of UL Screen Corner
  SW_Xpos    DW  ?  ; X pos of UL Screen Corner
  SW_Page    DW  ?  ; (new) Display Page
SW_STACK   ENDS

     PUBLIC SET_WINDOW

SET_WINDOW  PROC   FAR

  PUSH   BP              ; Preserve Registers
  MOV    BP, SP          ; Set up Stack Frame

  ; Check if our Scroll Offsets are Valid

  MOV    BX, [BP].SW_Page    ; Get Desired Page #
  CMP    BX, LAST_PAGE       ; Is Page # Valid?
  JAE    @SW_Exit            ; IF Not, Do Nothing
```

```
    MOV   AX, [BP].SW_Ypos   ; Get Desired Y Offset
    CMP   AX, MAX_YOFFSET    ; Is it Within Limits?
    JA    @SW_Exit           ; if not, exit

    MOV   CX, [BP].SW_Xpos   : Get Desired X Offset
    CMP   CX, MAX_XOFFSET    ; Is it Within Limits?
    JA    @SW_Exit           ; if not, exit

    ; Compute proper Display start address to use

    MUL   SCREEN_WIDTH       ; AX = YOffset * Line Width
    SHR   CX, 2              ; CX / 4 = Bytes into Line
    ADD   AX, CX             ; AX = Offset of Upper Left Pixel

    MOV   CURRENT_MOFFSET, AX ; Save Offset Info

    MOV   DISPLAY_PAGE, BX   ; Set Current Page #
    SHL   BX, 1              ; Scale Page # to Word
    ADD   AX, PAGE_ADDR[BX]  ; Get offset in VGA to Page
    MOV   BX, AX             ; BX = Desired Display Start

    MOV   DX, INPUT_1        ; Input Status #1 Register

    ; Wait if we are currently in a Vertical Retrace

@SW_WAIT0:
    IN    AL, DX             ; Get VGA status
    AND   AL, VERT_RETRACE   ; In Display mode yet?
    JNZ   @SW_WAIT0          ; If Not, wait for it

    ; Set the Start Display Address to the new window

    MOV   DX, CRTC_Index     ; We Change the VGA Sequencer
    MOV   AL, START_DISP_LO  ; Display Start Low Register
    MOV   AH, BL             ; Low 8 Bits of Start Addr
    OUT   DX, AX             ; Set Display Addr Low

    MOV   AL, START_DISP_HI  ; Display Start High Register
    MOV   AH, BH             ; High 8 Bits of Start Addr
    OUT   DX, AX             ; Set Display Addr High
```

```
    ; Wait for a Vertical Retrace to smooth out things

    MOV     DX, INPUT_1         ; Input Status #1 Register

@SW_WAIT1:
    IN      AL, DX              ; Get VGA status
    AND     AL, VERT_RETRACE    ; Vertical Retrace Start?
    JZ      @SW_WAIT1           ; If Not, wait for it

    ; Now Set the Horizontal Pixel Pan values

    OUT_8   ATTRIB_Ctrl, PIXEL_PAN_REG  ; Select Pixel Pan Register

    MOV     AX, [BP].SW_Xpos    ; Get Desired X Offset
    AND     AL, 03              ; Get # of Pixels to Pan (0-3)
    SHL     AL, 1               ; Shift for 256 Color Mode
    OUT     DX, AL              ; Fine tune the display!

@SW_Exit:
    POP     BP                  ; Restore Saved Registers
    RET     6                   ; Exit and Clean up Stack

SET_WINDOW      ENDP


;==============
;GET_X_OFFSET%
;==============
;
; Returns the X coordinate of the Pixel currently display
; in the upper left corner of the display
;
; ENTRY: No Parameters are passed
;
; EXIT:  AX = Current Horizontal Scroll Offset
;

    PUBLIC  GET_X_OFFSET
```

```
GET_X_OFFSET   PROC   FAR

  MOV    AX. CURRENT_XOFFSET ; Get current horz offset
  RET                    ; Exit & Clean Up Stack

GET_X_OFFSET   ENDP


;==============
;GET_Y_OFFSET%
;==============
;
; Returns the Y coordinate of the Pixel currently display
; in the upper left corner of the display
;
; ENTRY: No Parameters are passed
;
; EXIT:  AX = Current Vertical Scroll Offset
;

  PUBLIC  GET_Y_OFFSET

GET_Y_OFFSET   PROC   FAR

  MOV    AX, CURRENT_YOFFSET ; Get current vertical offset
  RET                    ; Exit & Clean Up Stack

GET_Y_OFFSET   ENDP


;=============
;SYNC_DISPLAY
;=============
;
; Pauses the computer until the next Vertical Retrace starts
;
; ENTRY: No Parameters are passed
;
; EXIT:  No meaningful values returned
;
```

```
  PUBLIC  SYNC_DISPLAY

SYNC_DISPLAY   PROC   FAR

  MOV     DX, INPUT_1        ; Input Status #1 Register

  ; Wait for any current retrace to end

@SD_WAIT0:
  IN      AL, DX             ; Get VGA status
  AND     AL, VERT_RETRACE   ; In Display mode yet?
  JNZ     @SD_WAIT0          ; If Not, wait for it

  ; Wait for the start of the next vertical retrace

@SD_WAIT1:
  IN      AL, DX             ; Get VGA status
  AND     AL, VERT_RETRACE   ; Vertical Retrace Start?
  JZ      @SD_WAIT1          ; If Not, wait for it

  RET                        ; Exit & Clean Up Stack

SYNC_DISPLAY   ENDP


  ; ===== TEXT DISPLAY ROUTINES =====

;==================================================
;GPRINTC (CharNum%, Xpos%, Ypos%, ColorF%, ColorB%)
;==================================================
;
; Draws an ASCII Text Character using the currently selected
; 8x8 font on the active display page.  It would be a simple
; exercise to make this routine process variable height fonts.
;
; ENTRY: CharNum = ASCII character # to draw
;        Xpos    = X position to draw Character at
;        Ypos    = Y position of to draw Character at
;        ColorF  = Color to draw text character in
```

```
;       ColorB  = Color to set background to
;
; EXIT:  No meaningful values returned
;

GPC_STACK   STRUC
   GPC_Width   DW  ?   ; Screen Width-1
   GPC_Lines   DB  ?,? ; Scan lines to Decode
   GPC_T_SETS  DW  ?   ; Saved Charset Segment
   GPC_T_SETO  DW  ?   ; Saved Charset Offset
               DW  ?x4 ; DI, SI, DS, BP
               DD  ?   ; Caller
   GPC_ColorB  DB  ?,? ; Background Color
   GPC_ColorF  DB  ?,? ; Text Color
   GPC_Ypos    DW  ?   ; Y Position to Print at
   GPC_Xpos    DW  ?   ; X position to Print at
   GPC_Char    DB  ?,? ; Character to Print
GPC_STACK   ENDS

      PUBLIC GPRINTC

GPRINTC    PROC    FAR

   PUSHx   BP, DS, SI, DI      ; Preserve Important Registers
   SUB     SP, 8               ; Allocate WorkSpace on Stack
   MOV     BP, SP              ; Set up Stack Frame

   LES     DI, d CURRENT_PAGE  ; Point to Active VGA Page

   MOV     AX, SCREEN_WIDTH    ; Get Logical Line Width
   MOV     BX, AX              ; BX = Screen Width
   DEC     BX                  ;    = Screen Width-1
   MOV     [BP].GPC_Width, BX  ; Save for later use

   MUL     [BP].GPC_Ypos       ; Start of Line = Ypos * Width
   ADD     DI, AX              ; DI -> Start of Line Ypos

   MOV     AX, [BP].GPC_Xpos   ; Get Xpos of Character
   MOV     CX, AX              ; Save Copy of Xpos
   SHR     AX, 2               ; Bytes into Line = Xpos/4
```

```
   ADD    DI, AX            ; DI -> (Xpos, Ypos)

   ;Get Source ADDR of Character Bit Map  & Save

   MOV    AL, [BP].GPC_Char  ; Get Character #
   TEST   AL, 080h          ; Is Hi Bit Set?
   JZ     @GPC_LowChar      ; Nope, use low char set ptr

   AND    AL, 07Fh          ; Mask Out Hi Bit
   MOV    BX, CHARSET_HI    ; BX = Char Set Ptr:Offset
   MOV    DX, CHARSET_HI+2  ; DX = Char Set Ptr:Segment
   JMP    s @GPC_Set_Char   ; Go Setup Character Ptr

@GPC_LowChar:

   MOV    BX, CHARSET_LOW    ; BX = Char Set Ptr:Offset
   MOV    DX, CHARSET_LOW+2  ; DX = Char Set Ptr:Segment

@GPC_Set_Char:
   MOV    [BP].GPC_T_SETS, DX ; Save Segment on Stack

   MOV    AH, 0             ; Valid #'s are 0..127
   SHL    AX, 3             ; * 8 Bytes Per Bitmap
   ADD    BX, AX            ; BX = Offset of Selected char
   MOV    [BP].GPC_T_SETO, BX ; Save Offset on Stack

   AND    CX, PLANE_BITS    ; Get Plane #
   MOV    CH, ALL_PLANES    ; Get Initial Plane mask
   SHL    CH, CL            ; And shift into position
   AND    CH, ALL_PLANES    ; And mask to lower nibble

   MOV    AL, 04            ; 4-Plane # = # of initial
   SUB    AL, CL            ; shifts to align bit mask
   MOV    CL, AL            ; Shift Count for SHL

   ;Get segment of character map

   OUT_8  SC_Index, MAP_MASK  ; Setup Plane selections
   INC    DX                ; DX -> SC_Data
```

```
  MOV   AL, 08          ; 8 Lines to Process
  MOV   [BP].GPC_Lines, AL  ; Save on Stack

  MOV   DS, [BP].GPC_T_SETS ; Point to character set

@GPC_DECODE_CHAR_BYTE:

  MOV   SI, [BP].GPC_T_SETO ; Get DS:SI = String

  MOV   BH, [SI]        ; Get Bit Map
  INC   SI              ; Point to Next Line
  MOV   [BP].GPC_T_SETO, SI ; And save new Pointer...

  CLR   AX              ; Clear AX

  CLR   BL              ; Clear BL
  ROL   BX, CL          ; BL holds left edge bits
  MOV   SI, BX          ; Use as Table Index
  AND   SI, CHAR_BITS   ; Get Low Bits
  MOV   AL, Char_Plane_Data[SI] ; Get Mask in AL
  JZ    @GPC_NO_LEFT1BITS   ; Skip if No Pixels to set

  MOV   AH, [BP].GPC_ColorF ; Get Foreground Color
  OUT   DX, AL          ; Set up Screen Mask
  MOV   ES:[DI], AH     ; Write Foreground color

@GPC_NO_LEFT1BITS:
  XOR   AL, CH          ; Invert mask for Background
  JZ    @GPC_NO_LEFT0BITS  ; Hey, no need for this

  MOV   AH, [BP].GPC_ColorB ; Get background Color
  OUT   DX, AL          ; Set up Screen Mask
  MOV   ES:[DI], AH     ; Write Foreground color

  ;Now Do Middle/Last Band

@GPC_NO_LEFT0BITS:
  INC   DI              ; Point to next Byte
  ROL   BX, 4           ; Shift 4 bits
```

```
MOV    SI, BX              ; Make Lookup Pointer
AND    SI, CHAR_BITS       ; Get Low Bits
MOV    AL, Char_Plane_Data[SI] ; Get Mask in AL
JZ     @GPC_NO_MIDDLE1BITS ; Skip if no pixels to set

MOV    AH, [BP].GPC_ColorF ; Get Foreground Color
OUT    DX, AL              ; Set up Screen Mask
MOV    ES:[DI], AH         ; Write Foreground color

@GPC_NO_MIDDLE1BITS:
XOR    AL, ALL_PLANES      ; Invert mask for Background
JZ     @GPC_NO_MIDDLE0BITS ; Hey, no need for this

MOV    AH, [BP].GPC_ColorB ; Get background Color
OUT    DX, AL              ; Set up Screen Mask
MOV    ES:[DI], AH         ; Write Foreground color

@GPC_NO_MIDDLE0BITS:
XOR    CH, ALL_PLANES      ; Invert Clip Mask
CMP    CL, 4               ; Aligned by 4?
JZ     @GPC_NEXT_LINE      ; If so, Exit now..

INC    DI                  ; Point to next Byte
ROL    BX, 4               ; Shift 4 bits

MOV    SI, BX              ; Make Lookup Pointer
AND    SI, CHAR_BITS       ; Get Low Bits
MOV    AL, Char_Plane_Data[SI] ; Get Mask in AL
JZ     @GPC_NO_RIGHT1BITS  ; Skip if No Pixels to set

MOV    AH, [BP].GPC_ColorF ; Get Foreground Color
OUT    DX, AL              ; Set up Screen Mask
MOV    ES:[DI], AH         ; Write Foreground color

@GPC_NO_RIGHT1BITS:

XOR    AL, CH              ; Invert mask for Background
JZ     @GPC_NO_RIGHT0BITS  ; Hey, no need for this

MOV    AH, [BP].GPC_ColorB ; Get background Color
```

```
  OUT    DX, AL          ; Set up Screen Mask
  MOV    ES:[DI], AH     ; Write Foreground color

@GPC_NO_RIGHT0BITS:
  DEC    DI              ; Adjust for Next Line Advance

@GPC_NEXT_LINE:
  ADD    DI, [BP].GPC_Width  ; Point to Next Line
  XOR    CH, CHAR_BITS       ; Flip the Clip mask back

  DEC    [BP].GPC_Lines      ; Count Down Lines
  JZ     @GPC_EXIT           ; Ok... Done!

  JMP    @GPC_DECODE_CHAR_BYTE  ; Again! Hey!

@GPC_EXIT:
  ADD    SP, 08          ; Deallocate stack workspace
  POPx   DI, SI, DS, BP  ; Restore Saved Registers
  RET    10              ; Exit and Clean up Stack

GPRINTC ENDP


;===============================================
;TGPRINTC (CharNum%, Xpos%, Ypos%, ColorF%)
;===============================================
;
; Transparently draws an ASCII Text Character using the
; currently selected 8x8 font on the active display page.
;
; ENTRY: CharNum = ASCII character # to draw
;        Xpos    = X position to draw Character at
;        Ypos    = Y position of to draw Character at
;        ColorF  = Color to draw text character in
;
; EXIT:  No meaningful values returned
;

TGP_STACK   STRUC
  TGP_Width   DW  ?   ; Screen Width-1
```

```
  TGP_Lines   DB ?,? ; Scan lines to Decode
  TGP_T_SETS  DW ?   ; Saved Charset Segment
  TGP_T_SETO  DW ?   ; Saved Charset Offset
        DW ?x4 ; DI, SI, DS, BP
        DD ?   ; Caller
  TGP_ColorF  DB ?,? ; Text Color
  TGP_Ypos    DW ?   ; Y Position to Print at
  TGP_Xpos    DW ?   ; X position to Print at
  TGP_Char    DB ?,? ; Character to Print
TGP_STACK  ENDS

    PUBLIC TGPRINTC

TGPRINTC   PROC   FAR

  PUSHx  BP, DS, SI, DI     ; Preserve Important Registers
  SUB    SP, 8              ; Allocate WorkSpace on Stack
  MOV    BP, SP             ; Set up Stack Frame

  LES    DI, d CURRENT_PAGE ; Point to Active VGA Page

  MOV    AX, SCREEN_WIDTH   ; Get Logical Line Width
  MOV    BX, AX             ; BX = Screen Width
  DEC    BX                 ;    = Screen Width-1
  MOV    [BP].TGP_Width, BX ; Save for later use

  MUL    [BP].TGP_Ypos      ; Start of Line = Ypos * Width
  ADD    DI, AX             ; DI -> Start of Line Ypos

  MOV    AX, [BP].TGP_Xpos  ; Get Xpos of Character
  MOV    CX, AX             ; Save Copy of Xpos
  SHR    AX, 2              ; Bytes into Line = Xpos/4
  ADD    DI, AX             ; DI -> (Xpos, Ypos)

  ;Get Source ADDR of Character Bit Map & Save

  MOV    AL, [BP].TGP_Char  ; Get Character #
  TEST   AL, 080h           ; Is Hi Bit Set?
  JZ     @TGP_LowChar       ; Nope, use low char set ptr
```

```
  AND    AL, 07Fh           ; Mask Out Hi Bit
  MOV    BX, CHARSET_HI      ; BX = Char Set Ptr:Offset
  MOV    DX, CHARSET_HI+2    ; DX = Char Set Ptr:Segment
  JMP    s @TGP_Set_Char     : Go Setup Character Ptr

@TGP_LowChar:

  MOV    BX, CHARSET_LOW     ; BX = Char Set Ptr:Offset
  MOV    DX, CHARSET_LOW+2   ; DX = Char Set Ptr:Segment

@TGP_Set_Char:
  MOV    [BP].TGP_T_SETS, DX ; Save Segment on Stack

  MOV    AH, 0              ; Valid #'s are 0..127
  SHL    AX, 3              ; * 8 Bytes Per Bitmap
  ADD    BX, AX             ; BX = Offset of Selected char
  MOV    [BP].TGP_T_SETO, BX ; Save Offset on Stack

  AND    CX, PLANE_BITS      ; Get Plane #
  MOV    CH, ALL_PLANES      ; Get Initial Plane mask
  SHL    CH, CL             ; And shift into position
  AND    CH, ALL_PLANES      ; And mask to lower nibble

  MOV    AL, 04             ; 4-Plane # = # of initial
  SUB    AL, CL             ; shifts to align bit mask
  MOV    CL, AL             ; Shift Count for SHL

  ;Get segment of character map

  OUT_8  SC_Index, MAP_MASK  ; Setup Plane selections
  INC    DX                 ; DX -> SC_Data

  MOV    AL, 08             ; 8 Lines to Process
  MOV    [BP].TGP_Lines, AL  ; Save on Stack

  MOV    DS, [BP].TGP_T_SETS ; Point to character set

@TGP_DECODE_CHAR_BYTE:

  MOV    SI, [BP].TGP_T_SETO ; Get DS:SI = String
```

```
MOV    BH, [SI]          ; Get Bit Map
INC    SI                ; Point to Next Line
MOV    [BP].TGP_T_SETO, SI ; And save new Pointer...

MOV    AH, [BP].TGP_ColorF ; Get Foreground Color

CLR    BL                ; Clear BL
ROL    BX, CL            ; BL holds left edge bits
MOV    SI, BX            ; Use as Table Index
AND    SI, CHAR_BITS     ; Get Low Bits
MOV    AL, Char_Plane_Data[SI] ; Get Mask in AL
JZ     @TGP_NO_LEFT1BITS    ; Skip if No Pixels to set

OUT    DX, AL            ; Set up Screen Mask
MOV    ES:[DI], AH       ; Write Foreground color

;Now Do Middle/Last Band

@TGP_NO_LEFT1BITS:

INC    DI                ; Point to next Byte
ROL    BX, 4             ; Shift 4 bits

MOV    SI, BX            ; Make Lookup Pointer
AND    SI, CHAR_BITS     ; Get Low Bits
MOV    AL, Char_Plane_Data[SI] ; Get Mask in AL
JZ     @TGP_NO_MIDDLE1BITS  ; Skip if no pixels to set

OUT    DX, AL            ; Set up Screen Mask
MOV    ES:[DI], AH       ; Write Foreground color

@TGP_NO_MIDDLE1BITS:
XOR    CH, ALL_PLANES    ; Invert Clip Mask
CMP    CL, 4             ; Aligned by 4?
JZ     @TGP_NEXT_LINE    ; If so, Exit now..

INC    DI                ; Point to next Byte
ROL    BX, 4             ; Shift 4 bits
```

```
   MOV    SI, BX              ; Make Lookup Pointer
   AND    SI, CHAR_BITS           ; Get Low Bits
   MOV    AL, Char_Plane_Data[SI] ; Get Mask in AL
   JZ     @TGP_NO_RIGHT1BITS      ; Skip if No Pixels to set

   OUT    DX, AL              ; Set up Screen Mask
   MOV    ES:[DI], AH         ; Write Foreground color

@TGP_NO_RIGHT1BITS:

   DEC    DI                  ; Adjust for Next Line Advance

@TGP_NEXT_LINE:
   ADD    DI, [BP].TGP_Width  ; Point to Next Line
   XOR    CH, CHAR_BITS       ; Flip the Clip mask back

   DEC    [BP].TGP_Lines      ; Count Down Lines
   JZ     @TGP_EXIT           ; Ok... Done!

   JMP    @TGP_DECODE_CHAR_BYTE   ; Again! Hey!

@TGP_EXIT:
   ADD    SP, 08              ; Deallocate stack workspace
   POPx   DI, SI, DS, BP      ; Restore Saved Registers
   RET    8                   ; Exit and Clean up Stack

TGPRINTC   ENDP


;==================================================================
=====
;PRINT_STR (SEG String, MaxLen%, Xpos%, Ypos%, ColorF%, ColorB%)
;==================================================================
=====
;
; Routine to quickly Print a null terminated ASCII string on the
; active display page up to a maximum length.
;
; ENTRY: String  = Far Pointer to ASCII string to print
;        MaxLen  = # of characters to print if no null found
```

```
;       Xpos    = X position to draw Text at
;       Ypos    = Y position of to draw Text at
;       ColorF  = Color to draw text in
;       ColorB  = Color to set background to
;
; EXIT:  No meaningful values returned
;

PS_STACK   STRUC
            DW  ?x4 ; DI, SI, DS, BP
            DD  ?   ; Caller
   PS_ColorB  DW  ?   ; Background Color
   PS_ColorF  DW  ?   ; Text Color
   PS_Ypos    DW  ?   ; Y Position to Print at
   PS_Xpos    DW  ?   ; X position to Print at
   PS_Len     DW  ?   ; Maximum Length of string to print
   PS_Text    DW  ?,? ; Far Ptr to Text String
PS_STACK   ENDS

      PUBLIC  PRINT_STR

PRINT_STR  PROC   FAR

   PUSHx  BP, DS, SI, DI      ; Preserve Important Registers
   MOV    BP, SP              ; Set up Stack Frame

@PS_Print_It:

   MOV    CX, [BP].PS_Len     ; Get Remaining text Length
   JCXZ   @PS_Exit            ; Exit when out of text

   LES    DI, d [BP].PS_Text  ; ES:DI -> Current Char in Text
   MOV    AL, ES:[DI]         ; AL = Text Character
   AND    AX, 00FFh           ; Clear High Word
   JZ     @PS_Exit            ; Exit if null character

   DEC    [BP].PS_Len         ; Remaining Text length--
   INC    [BP].PS_Text        ; Point to Next text char

   ; Set up Call to GPRINTC
```

```
  PUSH   AX               ; Set Character Parameter
  MOV    BX, [BP].PS_Xpos   ; Get Xpos
  PUSH   BX               ; Set Xpos Parameter
  ADD    BX, 8            ; Advance 1 Char to Right
  MOV    [BP].PS_Xpos, BX   ; Save for next time through

  MOV    BX, [BP].PS_Ypos   ; Get Ypos
  PUSH   BX               ; Set Ypos Parameter

  MOV    BX, [BP].PS_ColorF ; Get Text Color
  PUSH   BX               ; Set ColorF Parameter

  MOV    BX, [BP].PS_ColorB ; Get Background Color
  PUSH   BX               ; Set ColorB Parameter

  CALL   f GPRINTC          ; Print Character!
  JMP    s @PS_Print_It     ; Process next character

@PS_Exit:
  POPx   DI, SI, DS, BP     ; Restore Saved Registers
  RET    14               ; Exit and Clean up Stack

PRINT_STR  ENDP


;==========================================================
======
;TPRINT_STR (SEG String, MaxLen%, Xpos%, Ypos%, ColorF%, ColorB%)
;==========================================================
======
;
; Routine to quickly transparently Print a null terminated ASCII
; string on the active display page up to a maximum length.
;
; ENTRY: String  = Far Pointer to ASCII string to print
;       MaxLen  = # of characters to print if no null found
;       Xpos    = X position to draw Text at
;       Ypos    = Y position of to draw Text at
;       ColorF  = Color to draw text in
```

```
;
; EXIT:  No meaningful values returned
;

TPS_STACK   STRUC
            DW  ?x4 ; DI, SI, DS, BP
            DD  ?   ; Caller
  TPS_ColorF  DW  ?   ; Text Color
  TPS_Ypos    DW  ?   ; Y Position to Print at
  TPS_Xpos    DW  ?   ; X position to Print at
  TPS_Len     DW  ?   ; Maximum Length of string to print
  TPS_Text    DW  ?,? ; Far Ptr to Text String
TPS_STACK   ENDS

    PUBLIC  TPRINT_STR

TPRINT_STR  PROC   FAR

  PUSHx   BP, DS, SI, DI      ; Preserve Important Registers
  MOV     BP, SP              ; Set up Stack Frame

@TPS_Print_It:

  MOV     CX, [BP].TPS_Len    ; Get Remaining text Length
  JCXZ    @TPS_Exit           ; Exit when out of text

  LES     DI, d [BP].TPS_Text ; ES:DI -> Current Char in Text
  MOV     AL, ES:[DI]         ; AL = Text Character
  AND     AX, 00FFh           ; Clear High Word
  JZ      @TPS_Exit           ; Exit if null character

  DEC     [BP].TPS_Len        ; Remaining Text length--
  INC     [BP].TPS_Text       ; Point to Next text char

  ; Set up Call to TGPRINTC

  PUSH    AX                  ; Set Character Parameter
  MOV     BX, [BP].TPS_Xpos   ; Get Xpos
  PUSH    BX                  ; Set Xpos Parameter
  ADD     BX, 8               ; Advance 1 Char to Right
```

```
  MOV    [BP].TPS_Xpos, BX  ; Save for next time through

  MOV    BX, [BP].TPS_Ypos  ; Get Ypos
  PUSH   BX                 ; Set Ypos Parameter

  MOV    BX, [BP].TPS_ColorF ; Get Text Color
  PUSH   BX                 ; Set ColorF Parameter

  CALL   f TGPRINTC         ; Print Character!
  JMP    s @TPS_Print_It    ; Process next character

@TPS_Exit:
  POPx   DI, SI, DS, BP     ; Restore Saved Registers
  RET    12                 ; Exit and Clean up Stack

TPRINT_STR  ENDP


;==============================================
;SET_DISPLAY_FONT(SEG FontData, FontNumber%)
;==============================================
;
; Allows the user to specify their own font data for
; wither the lower or upper 128 characters.
;
; ENTRY: FontData   = Far Pointer to Font Bitmaps
;        FontNumber = Which half of set this is
;                   = 0, Lower 128 characters
;                   = 1, Upper 128 characters
;
; EXIT:  No meaningful values returned
;

SDF_STACK   STRUC
            DW  ?   ; BP
            DD  ?   ; Caller
  SDF_Which   DW  ?   ; Hi Table/Low Table Flag
  SDF_Font    DD  ?   ; Far Ptr to Font Table
SDF_STACK   ENDS
```

```
  PUBLIC SET_DISPLAY_FONT

SET_DISPLAY_FONT   PROC   FAR

  PUSH   BP             ; Preserve Registers
  MOV    BP, SP         ; Set up Stack Frame

  LES    DI, [BP].SDF_Font  ; Get Far Ptr to Font

  MOV    SI, o CHARSET_LOW  ; Assume Lower 128 chars
  TEST   [BP].SDF_Which, 1  ; Font #1 selected?
  JZ     @SDF_Set_Font      ; If not, skip ahead

  MOV    SI, o CHARSET_HI   ; Ah, really it's 128-255

@SDF_Set_Font:
  MOV    [SI], DI       ; Set Font Pointer Offset
  MOV    [SI+2], ES     ; Set Font Pointer Segment

  POP    BP             ; Restore Registers
  RET    6              ; We are Done.. Outa here

SET_DISPLAY_FONT   ENDP


  ; ===== BITMAP (SPRITE) DISPLAY ROUTINES =====

;==========================================================
;DRAW_BITMAP (SEG Image, Xpos%, Ypos%, Width%, Height%)
;==========================================================
;
; Draws a variable sized Graphics Bitmap such as a
; picture or an Icon on the current Display Page in
; Mode X.  The Bitmap is stored in a linear byte array
; corresponding to (0,0) (1,0), (2,0) .. (Width, Height)
; This is the same linear manner as mode 13h graphics.
;
; ENTRY: Image  = Far Pointer to Bitmap Data
;        Xpos   = X position to Place Upper Left pixel at
;        Ypos   = Y position to Place Upper Left pixel at
```

```
;       Width  = Width of the Bitmap in Pixels
;       Height = Height of the Bitmap in Pixels
;
; EXIT:  No meaningful values returned
;

DB_STACK    STRUC
   DB_LineO    DW  ?  ; Offset to Next Line
   DB_PixCount DW  ?   ; (Minimum) # of Pixels/Line
   DB_Start    DW  ?  ; Addr of Upper Left Pixel
   DB_PixSkew  DW  ?   ; # of bytes to Adjust EOL
   DB_SkewFlag DW  ?   ; Extra Pix on Plane Flag
            DW  ?x4 ; DI, SI, DS, BP
            DD  ?   ; Caller
   DB_Height   DW  ?  ; Height of Bitmap in Pixels
   DB_Width    DW  ?  ; Width of Bitmap in Pixels
   DB_Ypos     DW  ?  ; Y position to Draw Bitmap at
   DB_Xpos     DW  ?  ; X position to Draw Bitmap at
   DB_Image    DD  ?  ; Far Pointer to Graphics Bitmap
DB_STACK    ENDS

      PUBLIC    DRAW_BITMAP

DRAW_BITMAP PROC    FAR

   PUSHx   BP, DS, SI, DI       ; Preserve Important Registers
   SUB     SP, 10               ; Allocate workspace
   MOV     BP, SP               ; Set up Stack Frame

   LES     DI, d CURRENT_PAGE  ; Point to Active VGA Page
   CLD                          ; Direction Flag = Forward

   MOV     AX, [BP].DB_Ypos    ; Get UL Corner Ypos
   MUL     SCREEN_WIDTH        ; AX = Offset to Line Ypos

   MOV     BX, [BP].DB_Xpos    ; Get UL Corner Xpos
   MOV     CL, BL              ; Save Plane # in CL
   SHR     BX, 2               ; Xpos/4 = Offset Into Line

   ADD     DI, AX              ; ES:DI -> Start of Line
```

```
    ADD     DI, BX              ; ES:DI -> Upper Left Pixel
    MOV     [BP].DB_Start, DI   ; Save Starting Addr

    ; Compute line to line offset

    MOV     BX, [BP].DB_Width   ; Get Width of Image
    MOV     DX, BX              ; Save Copy in DX
    SHR     BX, 2               ; /4 = width in bands
    MOV     AX, SCREEN_WIDTH    ; Get Screen Width
    SUB     AX, BX              ; - (Bitmap Width/4)

    MOV     [BP].DB_LineO, AX       ; Save Line Width offset
    MOV     [BP].DB_PixCount, BX    ; Minimum # pix to copy

    AND     DX, PLANE_BITS          ; Get "partial band" size (0-3)
    MOV     [BP].DB_PixSkew, DX     ; Also End of Line Skew
    MOV     [BP].DB_SkewFlag, DX    ; Save as Flag/Count

    AND     CX, PLANE_BITS      ; CL = Starting Plane #
    MOV     AX, MAP_MASK_PLANE2 ; Plane Mask & Plane Select
    SHL     AH, CL              ; Select correct Plane
    OUT_16  SC_Index, AX        ; Select Plane...
    MOV     BH, AH              ; BH = Saved Plane Mask
    MOV     BL, 4               ; BL = Planes to Copy

@DB_COPY_PLANE:

    LDS     SI, [BP].DB_Image   ; DS:SI-> Source Image
    MOV     DX, [BP].DB_Height  ; # of Lines to Copy
    MOV     DI, [BP].DB_Start   ; ES:DI-> Dest pos

@DB_COPY_LINE:
    MOV     CX, [BP].DB_PixCount    ; Min # to copy

    TEST    CL, 0FCh            ; 16+PixWide?
    JZ      @DB_COPY_REMAINDER  ; Nope...

    ; Pixel Copy loop has been unrolled to x4

@DB_COPY_LOOP:
```

```
  MOVSB                 ; Copy Bitmap Pixel
  ADD     SI, 3         ; Skip to Next Byte in same plane
  MOVSB                 ; Copy Bitmap Pixel
  ADD     SI, 3         ; Skip to Next Byte in same plane
  MOVSB                 ; Copy Bitmap Pixel
  ADD     SI, 3         ; Skip to Next Byte in same plane
  MOVSB                 ; Copy Bitmap Pixel
  ADD     SI, 3         ; Skip to Next Byte in same plane

  SUB     CL, 4         ; Pixels to Copy=-4
  TEST    CL, 0FCh      ; 4+ Pixels Left?
  JNZ     @DB_COPY_LOOP     ; if so, do another block

@DB_COPY_REMAINDER:
  JCXZ    @DB_NEXT_LINE     ; Any Pixels left on line

@DB_COPY2:
  MOVSB                 ; Copy Bitmap Pixel
  ADD     SI,3          ; Skip to Next Byte in same plane
  LOOPx   CX, @DB_COPY2     ; Pixels to Copy--, Loop until done

@DB_NEXT_LINE:

  ; any Partial Pixels? (some planes only)

  OR      CX, [BP].DB_SkewFlag   ; Get Skew Count
  JZ      @DB_NEXT2         ; if no partial pixels

  MOVSB                 ; Copy Bitmap Pixel
  DEC     DI            ; Back up to align
  DEC     SI            ; Back up to align

@DB_NEXT2:
  ADD     SI, [BP].DB_PixSkew ; Adjust Skew
  ADD     DI, [BP].DB_LineO   ; Set to Next Display Line
  LOOPx   DX, @DB_COPY_LINE   ; Lines to Copy--, Loop if more

  ; Copy Next Plane....

  DEC     BL            ; Planes to Go--
```

```
   JZ     @DB_Exit          ; Hey! We are done

   ROL    BH, 1             ; Next Plane in line...
   OUT_8  SC_Data, BH       ; Select Plane

   CMP    AL, 12h           ; Carry Set if AL=11h
   ADC    [BP].DB_Start, 0  ; Screen Addr =+Carry
   INC    w [BP].DB_Image   ; Start @ Next Byte

   SUB    [BP].DB_SkewFlag, 1 ; Reduce Planes to Skew
   ADC    [BP].DB_SkewFlag, 0 ; Back to 0 if it was -1

   JMP    s @DB_COPY_PLANE  ; Go Copy the Next Plane

@DB_Exit:
   ADD    SP, 10            ; Deallocate workspace
   POPx   DI, SI, DS, BP    ; Restore Saved Registers
   RET    12                ; Exit and Clean up Stack

DRAW_BITMAP   ENDP


;==========================================================
;TDRAW_BITMAP (SEG Image, Xpos%, Ypos%, Width%, Height%)
;==========================================================
;
; Transparently Draws a variable sized Graphics Bitmap
; such as a picture or an Icon on the current Display Page
; in Mode X.  Pixels with a value of 0 are not drawn,
; leaving the previous "background" contents intact.
;
; The Bitmap format is the same as for the DRAW_BITMAP function.
;
; ENTRY: Image  = Far Pointer to Bitmap Data
;        Xpos   = X position to Place Upper Left pixel at
;        Ypos   = Y position to Place Upper Left pixel at
;        Width  = Width of the Bitmap in Pixels
;        Height = Height of the Bitmap in Pixels
;
; EXIT:  No meaningful values returned
```

```
TB_STACK    STRUC
  TB_LineO    DW ?  ; Offset to Next Line
  TB_PixCount DW ?  ; (Minimum) # of Pixels/Line
  TB_Start    DW ?  ; Addr of Upper Left Pixel
  TB_PixSkew  DW ?  ; # of bytes to Adjust EOL
  TB_SkewFlag DW ?  ; Extra Pix on Plane Flag
              DW ?x4 ; DI, SI, DS, BP
              DD ?  ; Caller
  TB_Height   DW ?  ; Height of Bitmap in Pixels
  TB_Width    DW ?  ; Width of Bitmap in Pixels
  TB_Ypos     DW ?  ; Y position to Draw Bitmap at
  TB_Xpos     DW ?  ; X position to Draw Bitmap at
  TB_Image    DD ?  ; Far Pointer to Graphics Bitmap
TB_STACK    ENDS

    PUBLIC  TDRAW_BITMAP

TDRAW_BITMAP  PROC  FAR

  PUSHx  BP, DS, SI, DI      ; Preserve Important Registers
  SUB    SP, 10              ; Allocate workspace
  MOV    BP, SP              ; Set up Stack Frame

  LES    DI, d CURRENT_PAGE  ; Point to Active VGA Page
  CLD                        ; Direction Flag = Forward

  MOV    AX, [BP].TB_Ypos    ; Get UL Corner Ypos
  MUL    SCREEN_WIDTH        ; AX = Offset to Line Ypos

  MOV    BX, [BP].TB_Xpos    ; Get UL Corner Xpos
  MOV    CL, BL              ; Save Plane # in CL
  SHR    BX, 2               ; Xpos/4 = Offset Into Line

  ADD    DI, AX              ; ES:DI -> Start of Line
  ADD    DI, BX              ; ES:DI -> Upper Left Pixel
  MOV    [BP].TB_Start, DI   ; Save Starting Addr

  ; Compute line to line offset
```

```
MOV    BX, [BP].TB_Width  ; Get Width of Image
MOV    DX, BX             ; Save Copy in DX
SHR    BX, 2              ; /4 = width in bands
MOV    AX, SCREEN_WIDTH   ; Get Screen Width
SUB    AX, BX             ; - (Bitmap Width/4)

MOV    [BP].TB_LineO, AX      ; Save Line Width offset
MOV    [BP].TB_PixCount, BX   ; Minimum # pix to copy

AND    DX, PLANE_BITS         ; Get "partial band" size (0-3)
MOV    [BP].TB_PixSkew, DX    ; Also End of Line Skew
MOV    [BP].TB_SkewFlag, DX   ; Save as Flag/Count

AND    CX, PLANE_BITS     ; CL = Starting Plane #
MOV    AX, MAP_MASK_PLANE2 ; Plane Mask & Plane Select
SHL    AH, CL             ; Select correct Plane
OUT_16 SC_Index, AX       ; Select Plane...
MOV    BH, AH             ; BH = Saved Plane Mask
MOV    BL, 4              ; BL = Planes to Copy

@TB_COPY_PLANE:

LDS    SI, [BP].TB_Image  ; DS:SI-> Source Image
MOV    DX, [BP].TB_Height ; # of Lines to Copy
MOV    DI, [BP].TB_Start  ; ES:DI-> Dest pos

; Here AH is set with the value to be considered
; "Transparent". It can be changed!

MOV    AH, 0              ; Value to Detect 0

@TB_COPY_LINE:
MOV    CX, [BP].TB_PixCount   ; Min # to copy

TEST   CL, 0FCh           ; 16+PixWide?
JZ     @TB_COPY_REMAINDER ; Nope...

; Pixel Copy loop has been unrolled to x4
```

```
@TB_COPY_LOOP:
  LODSB                 ; Get Pixel Value in AL
  ADD    SI, 3          ; Skip to Next Byte in same plane
  CMP    AL, AH         ; It is "Transparent"?
  JE     @TB_SKIP_01    ; Skip ahead if so
  MOV    ES:[DI], AL    ; Copy Pixel to VGA screen

@TB_SKIP_01:
  LODSB                 ; Get Pixel Value in AL
  ADD    SI, 3          ; Skip to Next Byte in same plane
  CMP    AL, AH         ; It is "Transparent"?
  JE     @TB_SKIP_02    ; Skip ahead if so
  MOV    ES:[DI+1], AL  ; Copy Pixel to VGA screen

@TB_SKIP_02:
  LODSB                 ; Get Pixel Value in AL
  ADD    SI, 3          ; Skip to Next Byte in same plane
  CMP    AL, AH         ; It is "Transparent"?
  JE     @TB_SKIP_03    ; Skip ahead if so
  MOV    ES:[DI+2], AL  ; Copy Pixel to VGA screen

@TB_SKIP_03:
  LODSB                 ; Get Pixel Value in AL
  ADD    SI, 3          ; Skip to Next Byte in same plane
  CMP    AL, AH         ; It is "Transparent"?
  JE     @TB_SKIP_04    ; Skip ahead if so
  MOV    ES:[DI+3], AL  ; Copy Pixel to VGA screen

@TB_SKIP_04:
  ADD    DI, 4          ; Adjust Pixel Write Location
  SUB    CL, 4          ; Pixels to Copy=-4
  TEST   CL, 0FCh       ; 4+ Pixels Left?
  JNZ    @TB_COPY_LOOP  ; if so, do another block

@TB_COPY_REMAINDER:
  JCXZ   @TB_NEXT_LINE  ; Any Pixels left on line

@TB_COPY2:
  LODSB                 ; Get Pixel Value in AL
  ADD    SI, 3          ; Skip to Next Byte in same plane
```

```
  CMP    AL, AH            ; It is "Transparent"?
  JE     @TB_SKIP_05        ; Skip ahead if so
  MOV    ES:[DI], AL        ; Copy Pixel to VGA screen

@TB_SKIP_05:
  INC    DI                ; Advance Dest Addr
  LOOPx  CX, @TB_COPY2       ; Pixels to Copy--, Loop until done

@TB_NEXT_LINE:

  ; any Partial Pixels? (some planes only)

  OR     CX, [BP].TB_SkewFlag   ; Get Skew Count
  JZ     @TB_NEXT2              ; if no partial pixels

  LODSB                  ; Get Pixel Value in AL
  DEC    SI              ; Backup to Align
  CMP    AL, AH            ; It is "Transparent"?
  JE     @TB_NEXT2          ; Skip ahead if so
  MOV    ES:[DI], AL        ; Copy Pixel to VGA screen

@TB_NEXT2:
  ADD    SI, [BP].TB_PixSkew ; Adjust Skew
  ADD    DI, [BP].TB_LineO   ; Set to Next Display Line
  LOOPx  DX, @TB_COPY_LINE   ; Lines to Copy--, Loop if More

  ;Copy Next Plane....

  DEC    BL              ; Planes to Go--
  JZ     @TB_Exit          ; Hey! We are done

  ROL    BH, 1             ; Next Plane in line...
  OUT_8  SC_Data, BH        ; Select Plane

  CMP    AL, 12h           ; Carry Set if AL=11h
  ADC    [BP].TB_Start, 0   ; Screen Addr =+Carry
  INC    w [BP].TB_Image    ; Start @ Next Byte

  SUB    [BP].TB_SkewFlag, 1 ; Reduce Planes to Skew
  ADC    [BP].TB_SkewFlag, 0 ; Back to 0 if it was -1
```

```
    JMP     @TB_COPY_PLANE      ; Go Copy the next Plane

@TB_Exit:
    ADD     SP, 10              ; Deallocate workspace
    POPx    DI, SI, DS, BP      ; Restore Saved Registers
    RET     12                  ; Exit and Clean up Stack

TDRAW_BITMAP    ENDP


    ; ==== VIDEO MEMORY to VIDEO MEMORY COPY ROUTINES =====

;===================================
;COPY_PAGE (SourcePage%, DestPage%)
;===================================
;
; Duplicate on display page onto another
;
; ENTRY: SourcePage = Display Page # to Duplicate
;        DestPage   = Display Page # to hold copy
;
; EXIT:  No meaningful values returned
;

CP_STACK    STRUC
            DW  ?x4 ; DI, SI, DS, BP
            DD  ?   ; Caller
    CP_DestP    DW  ?   ; Page to hold copied image
    CP_SourceP  DW  ?   ; Page to Make copy from
CP_STACK    ENDS

    PUBLIC  COPY_PAGE

COPY_PAGE   PROC    FAR

    PUSHx   BP, DS, SI, DI      ; Preserve Important Registers
    MOV     BP, SP              ; Set up Stack Frame
    CLD                         ; Block Xfer Forwards
```

```
; Make sure Page #'s are valid

MOV    AX, [BP].CP_SourceP ; Get Source Page #
CMP    AX, LAST_PAGE       ; is it > Max Page #?
JAE    @CP_Exit            ; if so, abort

MOV    BX, [BP].CP_DestP   ; Get Destination Page #
CMP    BX, LAST_PAGE       ; is it > Max Page #?
JAE    @CP_Exit            ; if so, abort

CMP    AX, BX              ; Pages #'s the same?
JE     @CP_Exit            ; if so, abort

; Setup DS:SI and ES:DI to Video Pages

SHL    BX, 1               ; Scale index to Word
MOV    DI, PAGE_ADDR[BX]   ; Offset to Dest Page

MOV    BX, AX              ; Index to Source page
SHL    BX, 1               ; Scale index to Word
MOV    SI, PAGE_ADDR[BX]   ; Offset to Source Page

MOV    CX, PAGE_SIZE       ; Get size of Page
MOV    AX, CURRENT_SEGMENT ; Get Video Mem Segment
MOV    ES, AX              ; ES:DI -> Dest Page
MOV    DS, AX              ; DS:SI -> Source Page

; Setup VGA registers for Mem to Mem copy

OUT_16 GC_Index, LATCHES_ON    ; Data from Latches = on
OUT_16 SC_Index, ALL_PLANES_ON ; Copy all Planes

; Note.. Do *NOT* use MOVSW or MOVSD - they will
; Screw with the latches which are 8 bits x 4

REP    MOVSB               ; Copy entire Page!

; Reset VGA for normal memory access

OUT_16 GC_Index, LATCHES_OFF   ; Data from Latches = off
```

```
@CP_Exit:
   POPx   DI, SI, DS, BP      ; Restore Saved Registers
   RET    4                   ; Exit and Clean up Stack

COPY_PAGE   ENDP


;===========================================================
================
;COPY_BITMAP (SourcePage%, X1%, Y1%, X2%, Y2%, DestPage%,
DestX1%, DestY1%)
;===========================================================
================
;
; Copies a Bitmap Image from one Display Page to Another
; This Routine is Limited to copying Images with the same
; Plane Alignment.  To Work: (X1 MOD 4) must = (DestX1 MOD 4)
; Copying an Image to the Same Page is supported, but results
; may be defined when the when the rectangular areas
; (X1, Y1) - (X2, Y2) and (DestX1, DestY1) -
; (DestX1+(X2-X1), DestY1+(Y2-Y1)) overlap...
; No Paramter checking to done to insure that
; X2 >= X1 and Y2 >= Y1.  Be Careful...
;
; ENTRY: SourcePage = Display Page # with Source Image
;        X1         = Upper Left Xpos of Source Image
;        Y1         = Upper Left Ypos of Source Image
;        X2         = Lower Right Xpos of Source Image
;        Y2         = Lower Right Ypos of Source Image
;        DestPage   = Display Page # to copy Image to
;        DestX1     = Xpos to Copy UL Corner of Image to
;        DestY1     = Ypos to Copy UL Corner of Image to
;
; EXIT:  AX = Success Flag:   0 = Failure / -1= Success
;

CB_STACK   STRUC
   CB_Height  DW  ?  ; Height of Image in Lines
   CB_Width   DW  ?  ; Width of Image in "bands"
```

```
        DW  ?x4 ; DI, SI, DS, BP
        DD  ?  ; Caller
  CB_DestY1   DW  ?  ; Destination Ypos
  CB_DestX1   DW  ?  ; Destination Xpos
  CB_DestP    DW  ?  ; Page to Copy Bitmap To
  CB_Y2       DW  ?  ; LR Ypos of Image
  CB_X2       DW  ?  ; LR Xpos of Image
  CB_Y1       DW  ?  ; UL Ypos of Image
  CB_X1       DW  ?  ; UL Xpos of Image
  CB_SourceP  DW  ?  ; Page containing Source Bitmap
CB_STACK    ENDS

    PUBLIC   COPY_BITMAP

COPY_BITMAP PROC   FAR

  PUSHx   BP, DS, SI, DI      ; Preserve Important Registers
  SUB     SP, 4               ; Allocate WorkSpace on Stack
  MOV     BP, SP              ; Set up Stack Frame

  ; Prep Registers (and keep jumps short!)

  MOV     ES, CURRENT_SEGMENT ; ES -> VGA Ram
  CLD                         ; Block Xfer Forwards

  ; Make sure Parameters are valid

  MOV     BX, [BP].CB_SourceP ; Get Source Page #
  CMP     BX, LAST_PAGE       ; is it > Max Page #?
  JAE     @CB_Abort           ; if so, abort

  MOV     CX, [BP].CB_DestP   ; Get Destination Page #
  CMP     CX, LAST_PAGE       ; is it > Max Page #?
  JAE     @CB_Abort           ; if so, abort

  MOV     AX, [BP].CB_X1      ; Get Source X1
  XOR     AX, [BP].CB_DestX1  ; Compare Bits 0-1
  AND     AX, PLANE_BITS      ; Check Plane Bits
  JNZ     @CB_Abort           ; They should cancel out
```

```
; Setup for Copy processing

OUT_8  SC_INDEX, MAP_MASK      ; Set up for Plane Select
OUT_16 GC_Index, LATCHES_ON    ; Data from Latches = on

; Compute Info About Images, Setup ES:SI & ES:DI

MOV    AX, [BP].CB_Y2      ; Height of Bitmap in lines
SUB    AX, [BP].CB_Y1      ; is Y2 - Y1 + 1
INC    AX                  ; (add 1 since were not 0 based)
MOV    [BP].CB_Height, AX  ; Save on Stack for later use

MOV    AX, [BP].CB_X2      ; Get # of "Bands" of 4 Pixels
MOV    DX, [BP].CB_X1      ; the Bitmap Occupies as X2-X1
SHR    AX, 2               ; Get X2 Band (X2 / 4)
SHR    DX, 2               ; Get X1 Band (X1 / 4)
SUB    AX, DX              ; AX = # of Bands - 1
INC    AX                  ; AX = # of Bands
MOV    [BP].CB_Width, AX   ; Save on Stack for later use

SHL    BX, 1               ; Scale Source Page to Word
MOV    SI, PAGE_ADDR[BX]   ; SI = Offset of Source Page
MOV    AX, [BP].CB_Y1      ; Get Source Y1 Line
MUL    SCREEN_WIDTH        ; AX = Offset to Line Y1
ADD    SI, AX              ; SI = Offset to Line Y1
MOV    AX, [BP].CB_X1      ; Get Source X1
SHR    AX, 2               ; X1 / 4 = Byte offset
ADD    SI, AX              ; SI = Byte Offset to (X1,Y1)

MOV    BX, CX              ; Dest Page Index to BX
SHL    BX, 1               ; Scale Source Page to Word
MOV    DI, PAGE_ADDR[BX]   ; DI = Offset of Dest Page
MOV    AX, [BP].CB_DestY1  ; Get Dest Y1 Line
MUL    SCREEN_WIDTH        ; AX = Offset to Line Y1
ADD    DI, AX              ; DI = Offset to Line Y1
MOV    AX, [BP].CB_DestX1  ; Get Dest X1
SHR    AX, 2               ; X1 / 4 = Byte offset
ADD    DI, AX              ; DI = Byte Offset to (D-X1,D-Y1)

MOV    CX, [BP].CB_Width   ; CX = Width of Image (Bands)
```

```
  DEC    CX              ; CX = 1?
  JE     @CB_Only_One_Band  ; 0 Means Image Width of 1 Band

  MOV    BX, [BP].CB_X1     ; Get Source X1
  AND    BX, PLANE_BITS     ; Aligned? (bits 0-1 = 00?)
  JZ     @CB_Check_Right    ; if so, check right alignment
  JNZ    @CB_Left_Band      ; not aligned? well..

@CB_Abort:
  CLR    AX              ; Return False (Failure)
  JMP    @CB_Exit           ; and Finish Up

  ; Copy when Left & Right Clip Masks overlap...

@CB_Only_One_Band:
  MOV    BX, [BP].CB_X1        ; Get Left Clip Mask
  AND    BX, PLANE_BITS        ; Mask out Row #
  MOV    AL, Left_Clip_Mask[BX]  ; Get Left Edge Mask
  MOV    BX, [BP].CB_X2        ; Get Right Clip Mask
  AND    BX, PLANE_BITS        ; Mask out Row #
  AND    AL, Right_Clip_Mask[BX] ; Get Right Edge Mask byte

  OUT_8  SC_Data, AL        ; Clip For Left & Right Masks

  MOV    CX, [BP].CB_Height  ; CX = # of Lines to Copy
  MOV    DX, SCREEN_WIDTH    ; DX = Width of Screen
  CLR    BX              ; BX = Offset into Image

@CB_One_Loop:
  MOV    AL, ES:[SI+BX]     ; Load Latches
  MOV    ES:[DI+BX], AL     ; Unload Latches
  ADD    BX, DX           ; Advance Offset to Next Line
  LOOPjz CX, @CB_One_Done    ; Exit Loop if Finished

  MOV    AL, ES:[SI+BX]     ; Load Latches
  MOV    ES:[DI+BX], AL     ; Unload Latches
  ADD    BX, DX           ; Advance Offset to Next Line
  LOOPx  CX, @CB_One_Loop    ; Loop until Finished

@CB_One_Done:
```

```
    JMP     @CB_Finish          ; Outa Here!

    ; Copy Left Edge of Bitmap

@CB_Left_Band:

    OUT_8   SC_Data, Left_Clip_Mask[BX] ; Set Left Edge Plane Mask

    MOV     CX, [BP].CB_Height  ; CX = # of Lines to Copy
    MOV     DX, SCREEN_WIDTH    ; DX = Width of Screen
    CLR     BX                  ; BX = Offset into Image

@CB_Left_Loop:
    MOV     AL, ES:[SI+BX]      ; Load Latches
    MOV     ES:[DI+BX], AL      ; Unload Latches
    ADD     BX, DX              ; Advance Offset to Next Line
    LOOPjz  CX, @CB_Left_Done   ; Exit Loop if Finished

    MOV     AL, ES:[SI+BX]      ; Load Latches
    MOV     ES:[DI+BX], AL      ; Unload Latches
    ADD     BX, DX              ; Advance Offset to Next Line
    LOOPx   CX, @CB_Left_Loop   ; Loop until Finished

@CB_Left_Done:
    INC     DI                  ; Move Dest Over 1 band
    INC     SI                  ; Move Source Over 1 band
    DEC     [BP].CB_Width       ; Band Width--

    ; Determine if Right Edge of Bitmap needs special copy

@CB_Check_Right:
    MOV     BX, [BP].CB_X2      ; Get Source X2
    AND     BX, PLANE_BITS      ; Aligned? (bits 0-1 = 11?)
    CMP     BL, 03h             ; Plane = 3?
    JE      @CB_Copy_Middle     ; Copy the Middle then!

    ; Copy Right Edge of Bitmap

@CB_Right_Band:
```

```
    OUT_8   SC_Data, Right_Clip_Mask[BX]    ; Set Right Edge Plane Mask

    DEC     [BP].CB_Width       ; Band Width--
    MOV     CX, [BP].CB_Height  ; CX = # of Lines to Copy
    MOV     DX, SCREEN_WIDTH    ; DX = Width of Screen
    MOV     BX, [BP].CB_Width   ; BX = Offset to Right Edge

@CB_Right_Loop:
    MOV     AL, ES:[SI+BX]      ; Load Latches
    MOV     ES:[DI+BX], AL      ; Unload Latches
    ADD     BX, DX              ; Advance Offset to Next Line
    LOOPjz  CX, @CB_Right_Done  ; Exit Loop if Finished

    MOV     AL, ES:[SI+BX]      ; Load Latches
    MOV     ES:[DI+BX], AL      ; Unload Latches
    ADD     BX, DX              ; Advance Offset to Next Line
    LOOPx   CX, @CB_Right_Loop  ; Loop until Finished

@CB_Right_Done:

    ; Copy the Main Block of the Bitmap

@CB_Copy_Middle:

    MOV     CX, [BP].CB_Width   ; Get Width Remaining
    JCXZ    @CB_Finish          ; Exit if Done

    OUT_8   SC_Data, ALL_PLANES ; Copy all Planes

    MOV     DX, SCREEN_WIDTH    ; Get Width of Screen minus
    SUB     DX, CX              ; Image width (for Adjustment)
    MOV     AX, [BP].CB_Height  ; AX = # of Lines to Copy
    MOV     BX, CX              ; BX = Quick REP reload count
    MOV     CX, ES              ; Move VGA Segment
    MOV     DS, CX              ; Into DS

    ; Actual Copy Loop.  REP MOVSB does the work

@CB_Middle_Copy:
    MOV     CX, BX              ; Recharge Rep Count
```

```
  REP    MOVSB            ; Move Bands
  LOOPjz  AX, @CB_Finish    ; Exit Loop if Finished

  ADD    SI, DX          ; Adjust DS:SI to Next Line
  ADD    DI, DX          ; Adjust ES:DI to Next Line

  MOV    CX, BX           ; Recharge Rep Count
  REP    MOVSB            ; Move Bands

  ADD    SI, DX          ; Adjust DS:SI to Next Line
  ADD    DI, DX          ; Adjust ES:DI to Next Line
  LOOPx  AX, @CB_Middle_Copy ; Copy Lines until Done

@CB_Finish:
  OUT_16 GC_Index, LATCHES_OFF  ; Data from Latches = on

@CB_Exit:
  ADD    SP, 04          ; Deallocate stack workspace
  POPx   DI, SI, DS, BP     ; Restore Saved Registers
  RET    16            ; Exit and Clean up Stack

COPY_BITMAP ENDP

  END               ; End of Code Segment
```

We claim:

1. A method for counting banknotes employing an optical sensor comprising:

providing a stack of banknotes; and counting the number of banknotes in the stack characterized in that the mutual orientation of the banknotes relative to said optical sensor is substantially maintained, the counting step including:

employing at least one optical sensor for generally simultaneously viewing at least two separate columns along a surface defined by edges of the banknotes in the stack; and receiving an output from said optical sensor and providing an output indication of a number of banknotes in the stack.

2. Apparatus for counting stacked sheets comprising:

at least one optical sensor for generally simultaneously viewing at least two separate columns along a surface defined by edges of the stacked sheets; and image processing apparatus receiving an output from said optical sensor and providing an output indication of a number of sheets in the stack.

3. Apparatus according to claim 2 wherein the optical sensor comprises a plurality of sensing elements respectively viewing said at least two separate columns.

4. Apparatus according to claim 2 wherein the optical sensor has a two-dimensional field of view.

5. Apparatus according to claim 2 and also comprising apparatus for varying the position of the stack relative to the optical sensor.

6. Apparatus according to claim 5 wherein said apparatus for varying comprises apparatus for moving the stack.

7. Apparatus according to claim 2 wherein said at least one optical sensor comprises a plurality of optical sensors each of which is operative to view a plurality of locations along a side of a different stack.

8. Apparatus according to claim 2 wherein said optical sensor is operative to repeatedly view at least one location along the stack of objects.

9. Apparatus according to claim 2 wherein said at least one optical sensor comprises a plurality of optical sensors each of which is operative to view at least a portion of a side of a different stack of objects.

10. Apparatus according to claim 2 and also comprising a plurality of light sources illuminating the stacked objects.

11. Apparatus according to claim 2 and also comprising at least one support for supporting at least one stack of objects and wherein the at least one optical sensor is disposed behind the at least one support for viewing at least a portion of a side of a stack of objects through the support.

12. A method for counting stacked objects comprising:

viewing at least a portion of a side of a stack of objects first at least under first illumination conditions and thereafter under second illumination conditions; and image processing apparatus receiving an output from said optical sensor comprising a first image of at least a portion of the stack under the first illumination conditions and a second image of at least a portion of the stack under the second illumination conditions, and operative to compare the two images and to provide an output indication of a number of objects in the stack.

13. A method according to claim 12 wherein the stack portion is viewed from the side.

14. Apparatus for counting stacked objects comprising:

at least one support for supporting at least one stack of objects;

at least one optical sensor disposed behind the at least one support for viewing at least a portion of a side of a stack of objects through the supporting while the mutual orientation of the objects is maintained relative to the at least one optical sensor; and image processing apparatus receiving an output from said optical sensor and providing an output indication of a number of objects in the stack.

15. Apparatus according to claim 14 wherein the support is transparent.

16. Apparatus according to claim 14 wherein the support has at least one window formed therein.

17. Apparatus according to claim 14 and also comprising a plurality of light source illuminating the stacked objects.

* * * * *